(12) United States Patent
Ward et al.

(10) Patent No.: US 6,700,835 B1
(45) Date of Patent: Mar. 2, 2004

(54) SYSTEM FOR SUBSEA DIVERLESS METROLOGY AND HARD-PIPE CONNECTION OF PIPELINES

(75) Inventors: Nic Ward, Hampshire (GB); Andy Walker, Hampshire (GB); Per Sparrevik, Oslo (NO)

(73) Assignee: Den Norske Stats Oljeselskap A.S., Stavanger (NO)

( * ) Notice: Subject to any disclaimer, the term of this patent is extended or adjusted under 35 U.S.C. 154(b) by 0 days.

(21) Appl. No.: 09/830,186

(22) PCT Filed: Feb. 2, 2000

(86) PCT No.: PCT/NO00/00031
§ 371 (c)(1),
(2), (4) Date: Jul. 23, 2001

(87) PCT Pub. No.: WO00/66925
PCT Pub. Date: Nov. 9, 2000

(30) Foreign Application Priority Data
May 4, 1999 (NO) .......................... 19992180

(51) Int. Cl.⁷ ............................. F16L 1/26; G01B 5/25; G01B 7/31
(52) U.S. Cl. .................................................... 367/131
(58) Field of Search .................... 367/131; 405/170, 405/158; 33/754

(56) References Cited

U.S. PATENT DOCUMENTS

| | | | |
|---|---|---|---|
| 4,528,757 A | 7/1985 | McKeechan et al. | 33/529 |
| 4,559,716 A | 12/1985 | Daughtry et al. | 33/529 |

FOREIGN PATENT DOCUMENTS

| | | | |
|---|---|---|---|
| CA | 2370166 A1 | * | 11/2000 |
| WO | WO-0066925 | * | 11/2000 |

OTHER PUBLICATIONS

H. Yasunari and H. Teruhide, "Device for Measuring Distance Between Pipes and the Like", Jul. 1999 Japan 11–190602, ABSTRACT.

* cited by examiner

Primary Examiner—Daniel T. Pihulic
(74) Attorney, Agent, or Firm—Foley & Lardner

(57) ABSTRACT

Device for subsea metrology of distance and relative orientation of a first termination (10) with a local reference system ($x_r$, $y_r$, $z_r$) and which by means of a jumper spool piece (5) is going to be connected to a separate second termination (20) having a local reference system ($x_B$, $y_B$, $z_B$), characterized by a base metrology unit (2) arranged for being carried by an ROV (4), and arranged for aligned arrangement with the second or the first termination's (20, 10) reference system, and comprising the following features: a wire (3) with an extractable first end (31) being arranged for being attached to a receptacle device (7, 7') arranged on the termination (10, 20) for receiving the wire's (3) first end (31) or a metrology unit with and with a wire tensioner device (32) arranged for tensioning the wire (3) between the base metrology unit (2) and the receptacle device (7, 7'); a wire length sensor (34) arranged for measuring the length ($D_{rB}$) of the extended taut wire (3); a relative azimuth sensing device (92) arranged to measure [and store] the relative azimuth ($\theta_B$, $\theta_r$) value of the taut wire (3) with respect to the base metrology unit's (2) mainly horizontal axes ($x_B$, $y_B$); and a submerged-depth sensor (52) arranged for measuring the submerged depth ($d_B$) of the base metrology unit (2).

32 Claims, 13 Drawing Sheets

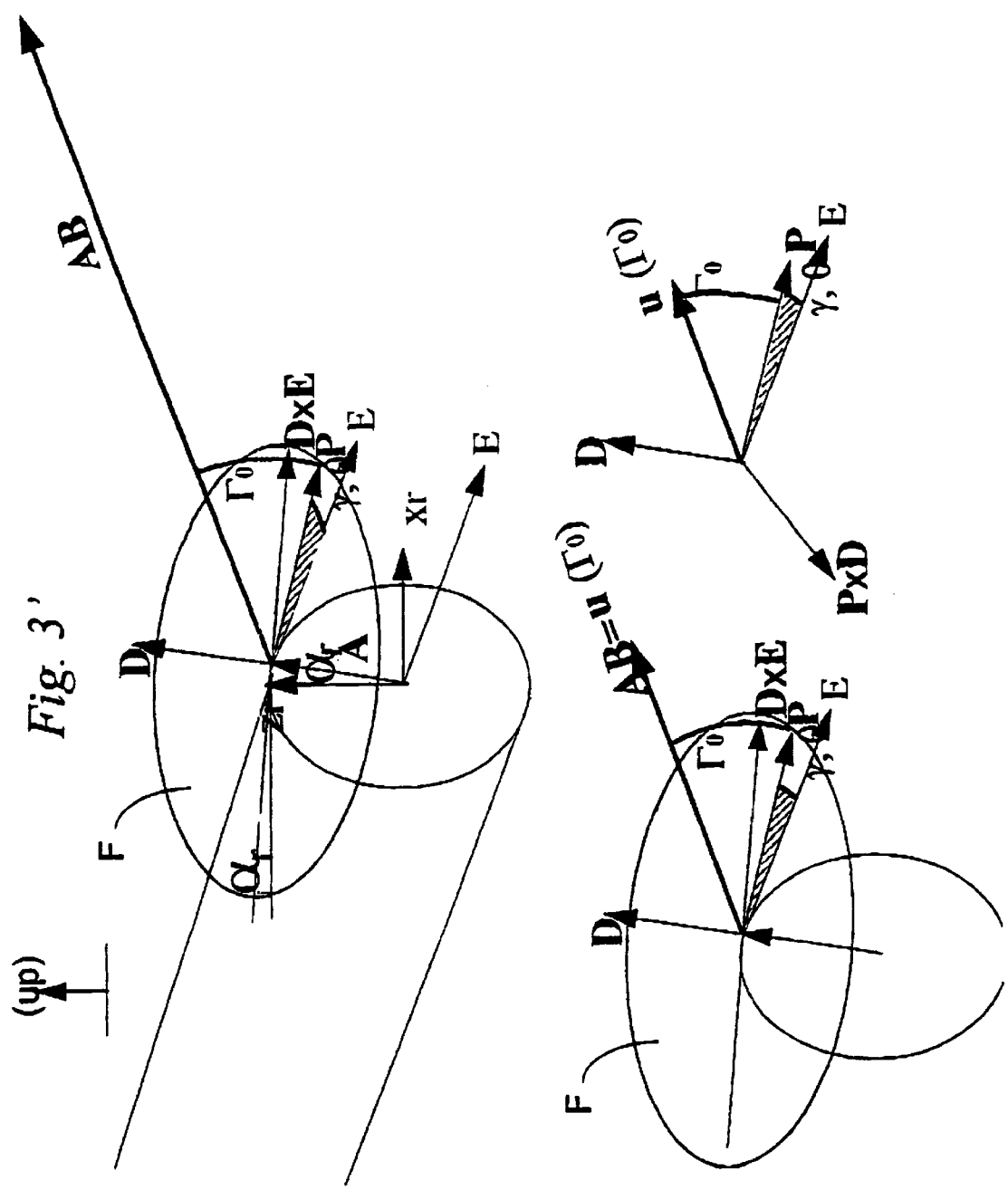

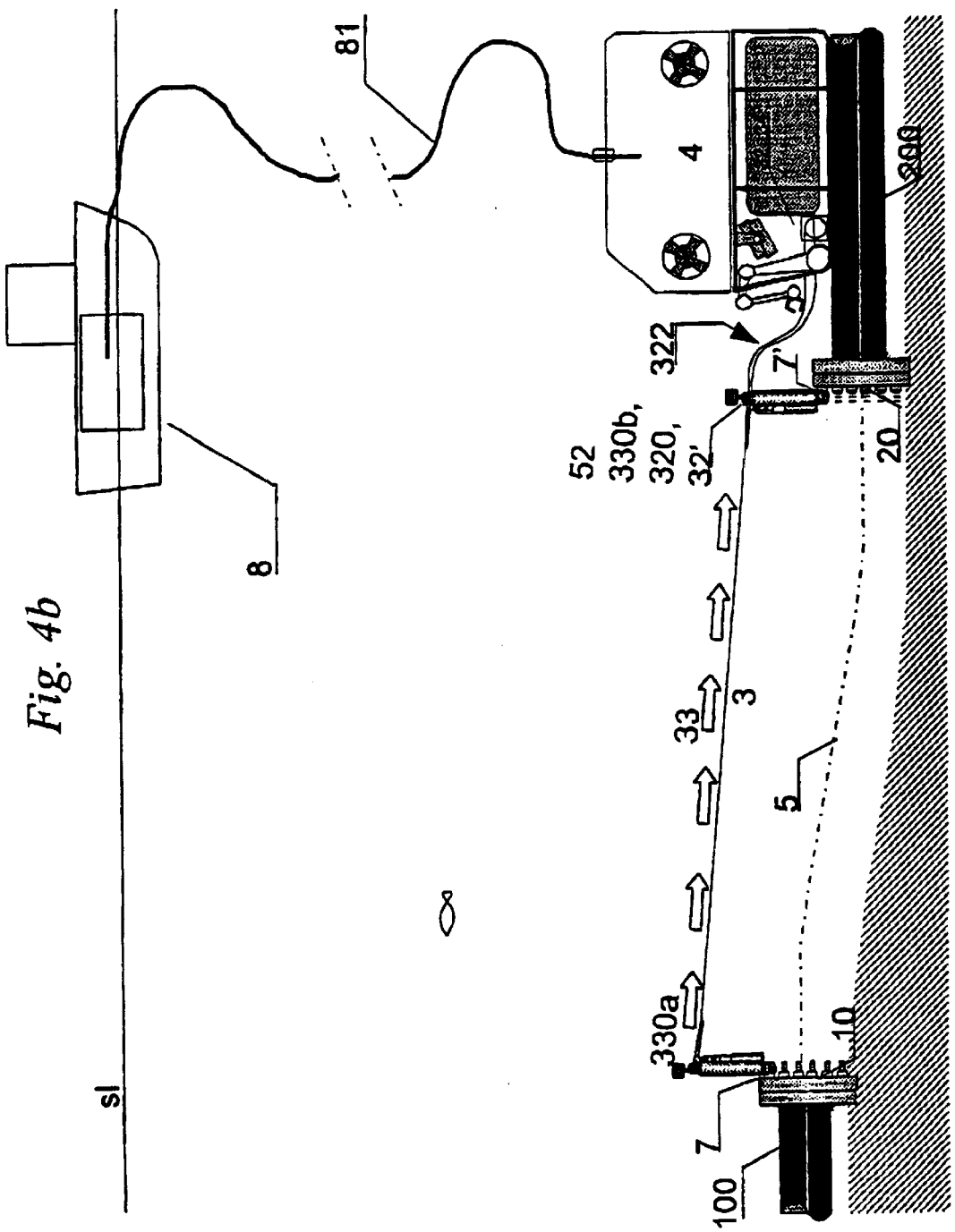

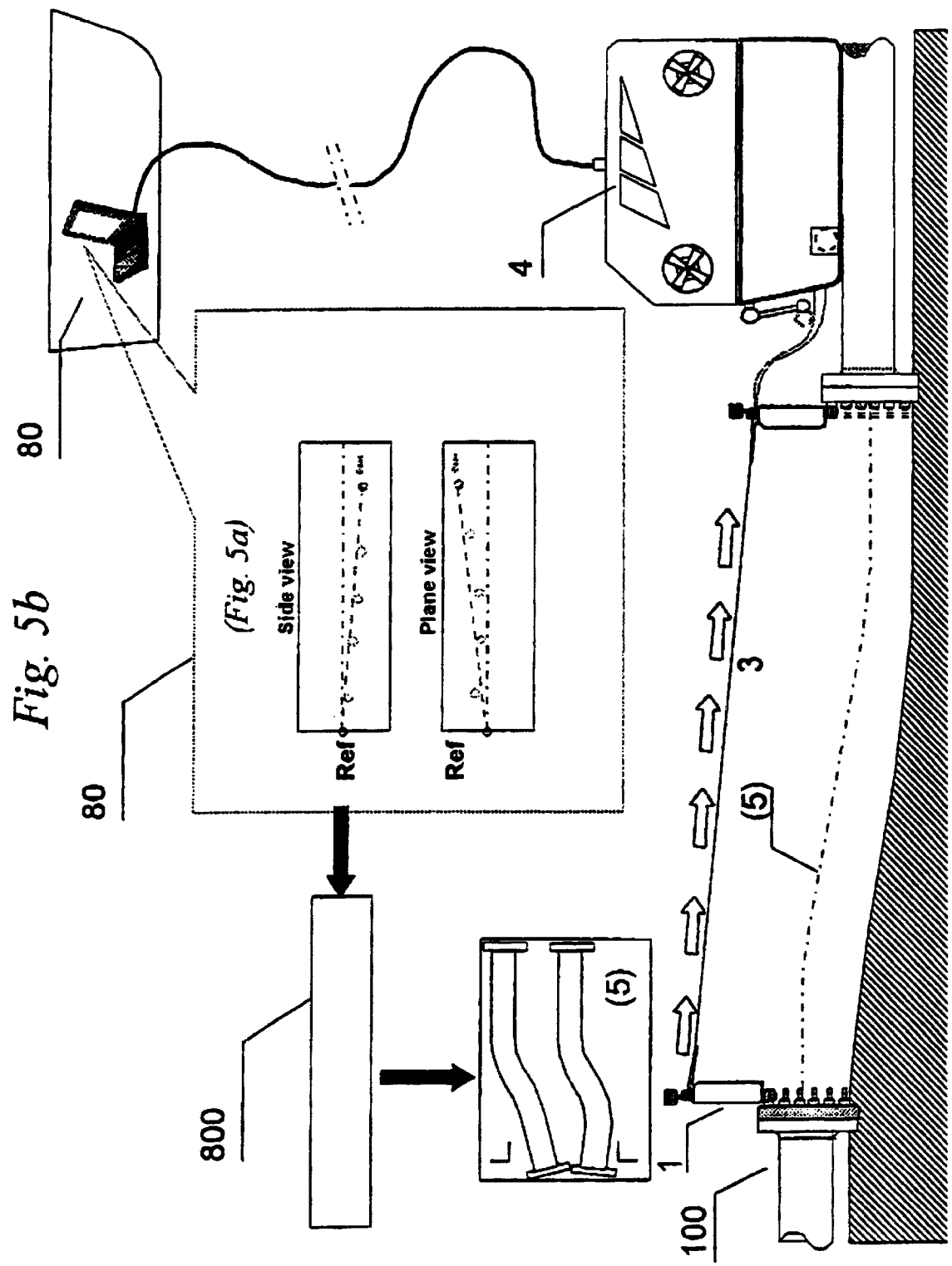

SYSTEM FOR SUBSEA DIVERLESS METROLOGY AND HARD-PIPE CONNECTION OF PIPELINES

CONTENTS

Background of the invention.

Description of the related art.
  Manual, diver-assisted metrology.
  ROV-assisted metrology.

An overview of embodiments of the invention in a general context.
  I: A "full Smartwire" device embodiment.
  II: A "full Smartwire" method embodiment.
  III: A "light" Smartwire device embodiment.
  IV: A "mapping" method embodiment.
  V: A "positioning" method embodiment.

Summary of the invention.

Brief description of the drawings.

Specification of a preferred embodiment of the invention, (with reference numerals referring to the drawings and the set of claims).
  III: A "light"-Smartwire device embodiment.
  II: A "Smartwire" method embodiment.
  I: A "full" Smartwire device embodiment.
    The subsea operation using the full device.
  IV: A "mapping" method embodiment.
  V: A "positioning" method embodiment.
    Mathematical outline of the metrology calculations.
    Computer implementation
    Robustness of measurements.
    Displacement along the pipe or hub.
    Multiple hubs on a manifold.

Claims.

Figure 1A:
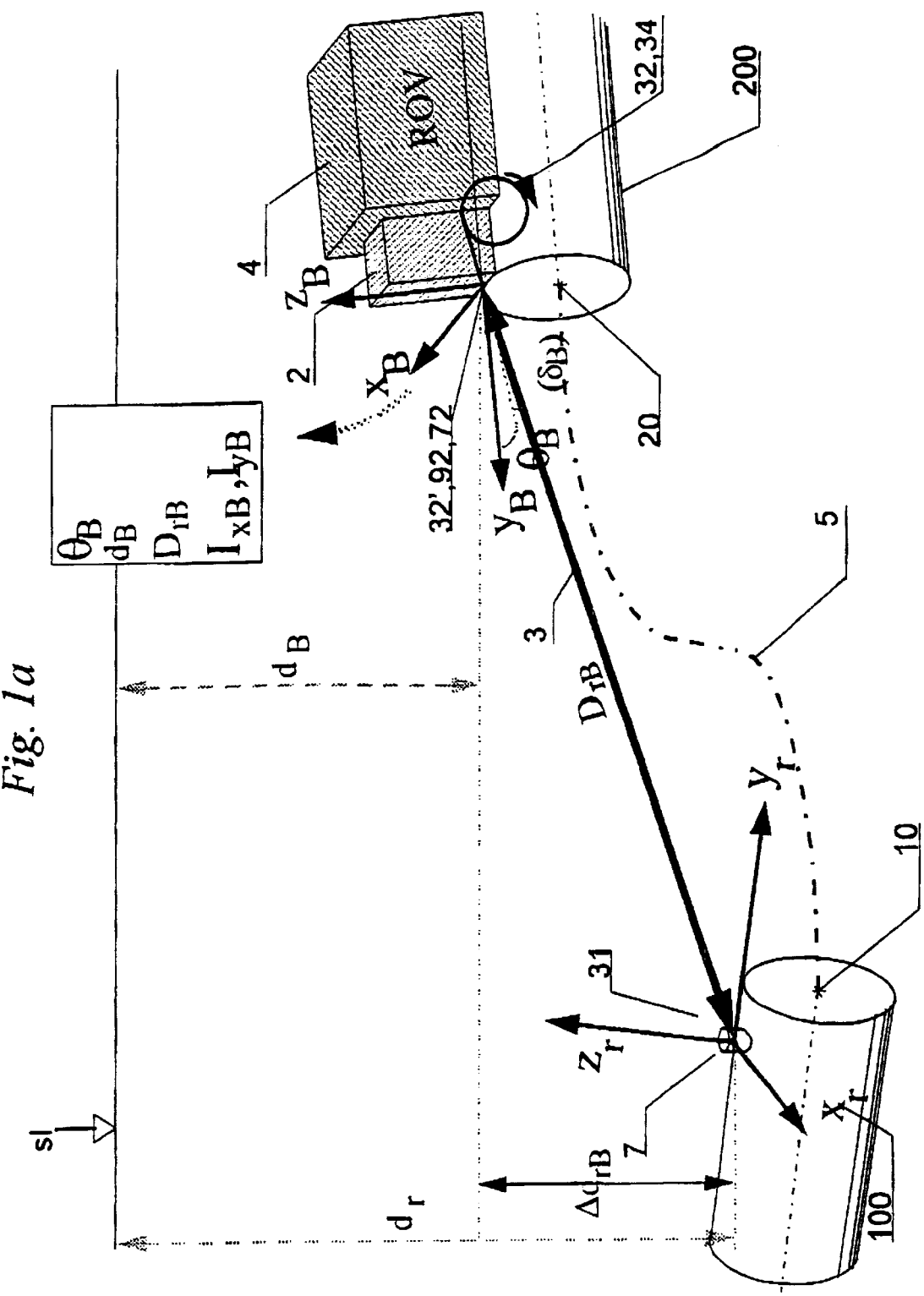

Abstract.

BACKGROUND OF THE INVENTION

1. Field of the Invention

This invention relates to an ROV-supported metrology device and a method for precision measurements of relative position and orientation of two or more objects (connection points) at the seabed, e.g. measuring distance and relative orientation of two pipe terminations subsea; two pipe flanges which are to be connected. To give an example, pipelines which are laid out ready on the seabed, shall be connected to a subsea manifold which becomes lowered to the seabed in a separate operation, see FIG. 2. The manifold has pipeline receptors/hubs which are to be connected with the pipeline terminations via hard-piped so-called tie-in jumpers or spoolpieces. The position for the manifold on the seabed must be within a predefined area, but it is infeasible to predetermine this position precisely enough to allow for rigid prefabricated jumper spools made in steel. The pipelines shall be connected to the manifold's hubs via hard-piped jumper spools which must be tailored according to the local separations and relative orientations. Installation of flexible jumpers are not considered.

2. Description of the Related Art

Manual, Diver-assisted Metrology

Manual equipment for metrology of manifold and pipeline relative orientation and separation exists. Such measurements are made by divers on the site and later reproduced using the same equipment in a jig at a surface vessel or onshore. End pieces with the desired orientation and separation are arranged in the jig, and then a jumper spool is welded to the end pieces and tested. Thereafter the jumper spoolpiece is lowered down and placed between the manifold and the pipeline, and connected.

Disadvantages of Manual Metrology

Manual metrology performed by divers is inaccurate, time-consuming and expensive. Diver assistance is not feasible for the entire depth range considered, often more than 300 meters, down to more than 1500 meters. Generally, the use of diver assistance may be discouraged due to the general health hazard connected with offshore diving.

ROV-assisted Metrology

A system for ROV-assisted diverless metrology of subsea installations and subsequent hard-piping connection between a production manifold and pipelines, is described in *Offshore Technology Conference*, 1996: *OTC* 8134: Sanjay K. Reddy et al: *"Diverless Hard-Pipe Connection Systems for Subsea Pipelines and Flowlines"*. The measurement system "Pre-Measurement Tool", PMT, comprises a "Measurement Tool", MT, with a landing/alignment pin arranged for a measurement receptacle on the termination to be measured. The MT is provided with a length metering cable, two inclinometers and horizontal and vertical angle readouts for the taut-cable orientation. A "Measurement Pin", MP, with a landing pin arranged for a receptacle on the other termination to be measured is to be connected via the cable, all shown in FIGS. 5 and 10 of the article OTC 8134. The cable is drawn from the MT and hooked onto the MP by means of an ROV. The ROV then reads off the horizontal relative azimuth and vertical inclination of the cable relative to the MT. The ROV camera must be moved into position to view the inclinometers of the MT. The reading of the scales is conducted by an operator on the surface via the ROV camera.

Disadvantages of the Known ROV Metrology

The camera reading procedure is a separate source of error, as a parallax error will arise because of the orientation between the ROV camera and the scales to be viewed. Another problem with the existing diverless system is the time-consuming ROV-manoevering procedure to get the camera in position for reading off the angles. This measuring must be conducted at both terminations, thus doubling the effort of measuring the orientation of the two separations. The readings are, as with the diver-assisted method, mimicked at the surface in a "manifold end/pipeline end construction jig" having receptacles at either end for the PMT tools MT and MP, and height and inclination adjustment for the receptacles. Jumper spool endpieces are then mounted at either receptacle and a spool pipe with the desired length and orientation is then welded between the jumper spool endpieces sitting in the construction jig. The resulting jumper spoolpiece is then lowered and connected accordingly.

In addition to the parallax problems, another problem has been described as inconsistent pull force of the PMT tool, a pull which depends on the ROV hot stab pressure.

Thus it is desirable to have a system which overcomes the inaccuracy of reading the angles.

It is desirable to have a metrology system which overcomes the slow measurement procedure of the existing systems. It is also highly desirable to have a method and a device being independent of divers. It is also desirable to have a metrology system being independent of the the pull force of the hot stab of the ROV.

In addition, it is desirable to have a metrology system also being capable of conducting local mapping of the seabed and structures around a local reference system defined by e.g. a manifold frame which has been arranged at the seabed. It is equally desirable to have a system being capable of setting out markers, e.g. marker buoys, for indicating the future position for equipment which shall be arranged at the seabed in a reference system being relative to e.g. a manifold frame at the seabed. Arranging passive markers at the seabed according to one method of the invention eliminates the need for maintenance of transponder arrays.

The existing system requires that the wire is extended between two receptacle points before the angles are measured. The existing system is not capable of being used for determining positions on the seabed relative to one existing receptacle at e.g. a manifold's termination without having a first ROV to hold and tension the wire, and a second ROV to read off the angles at the receptacle's end of the wire. Thus it is desirable to have a metrology system capable of mapping and determining positions on the seabed relative to one existing receptacle at e.g. a manifold termination in one single tensioning-and-measuring operation with one single ROV.

An Overview of Embodiments of the Invention in a General Context

The invention is embodied both in a device and several methods for subsea metrology. There are several modes of operating different preferred embodiments of the invention:

I: A "full Smartwire" device embodiment;
II: A "Smartwire" method embodiment;
III: A "light" Smartwire device embodiment;
IV: A "mapping" method embodiment.
V: A "positioning" method embodiment.

On I and II: "Full Smartwire" Device and Smartwire Method Embodiment

A "full Smartwire" device and Smartwire method embodiment of the invention may be described with reference to FIG. 1c and FIG. 1e: An ROV may generally carry two metrology units. A so-called "reference" metrology unit is attatched to e.g. a manifold's (or a pipeline's) termination, e.g. a hub. A so-called "base" metrology unit is carried to a basically independent pipeline termination, normally a flange, and attached to that pipeline termination, by the ROV. The ROV will be controlled to attach the metrology units with their base-planes preferreably being close to the true horizontal plane. A wire is connectng the two metrology units, and is tensioned. Several measurements are conducted by the two metrology units:

The length of the taut wire, preferrably by the tensioning metrology unit,
the depth of submergence of the base metrology unit (on the manifold termination),
the entry angle of the taut wire as projected in a generally horizontal plane on the base metrology unit,
the depth of submergence of the reference metrology unit (on the pipeline termination),
the entry angle of the taut wire as projected in a generally horizontal plane on the reference metrology unit,
in a preferred embodiment, the base metrology unit's deviation angles from the true horizontal, and
in a preferred embodiment, the reference metrology unit's deviation angles from the true horizontal.

The measurements conducted by the reference unit at the end of the extendable wire are transferred to the base unit and preferrably to the ROV. The distance and the relative orientations of the units are then calculated on the basis of the above mentioned measurements. The measurements may be stored and post-processed by the ROV's re-emergence to the surface, but according to a most preferred embodiment, the invention is tailor-made for offshore use as follows: An algorithm for a metrology process is arranged for real-time calculation of the relative positions and to display data (illustrated in FIG. 5a) in data acquisition units at the surface (illustrated in FIGS. 4b and 5b). Relative positions and orientations of the two terminations are calculated, and may be transferred to a CAD/CAM unit to produce engineering drawings for production of tailor-made rigid jumper spool-pieces directly after the measurements have been conducted.

Figure 4A:
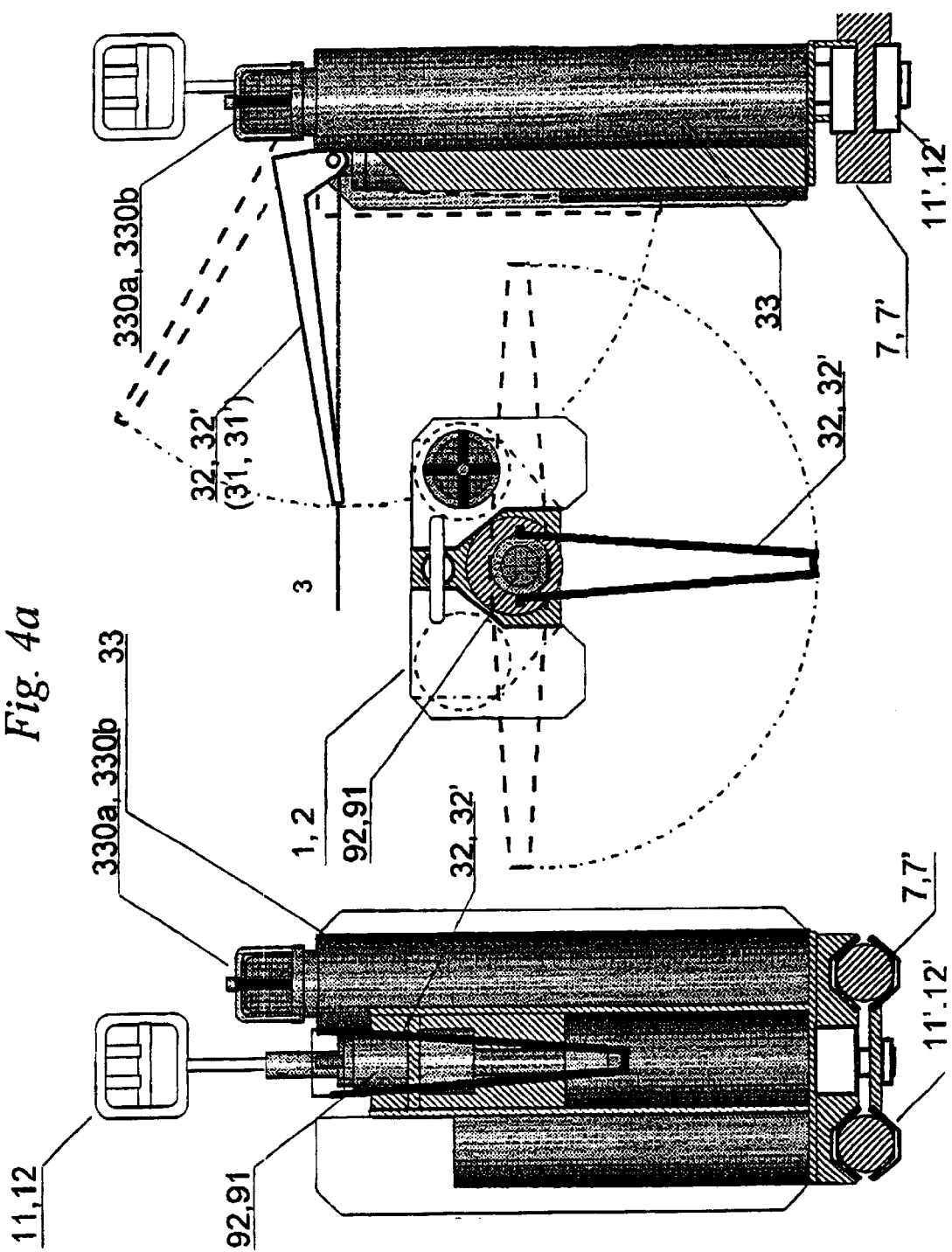

The taut wire's angle is measured by means of a trailing arm with an angle encoder as displayed in FIG. 4a. In the described embodiment of the invention, only one horizontal wire angle encoder is employed at each metrology unit. This results in a more rugged device than a metrology device having both a horizontal angle encoder and a vertical angle encoder. It will be shown in a mathematical section that the measurements to be taken are sufficient for determining the relative positions and orientations of the two pipeline terminations.

On III: "Light" Embodiment

A "light" Smartwire device embodiment of the invention is illustrated in FIG. 1a. The "light" Smartwire device comprises the following overall equipment: A metrology unit is carried by an ROV, playing both roles of "base" and "reference" metrology units. The metrology unit is provided with an extendable wire. The extendable end of the wire is arranged to be attached to a dedicated receptacle at a separate manifold (or pipeline) "reference" termination. The metrology unit is arranged to be carried by the ROV to an independent pipeline "base" termination and to attach it there. The wire is then tensioned. A first "base" half set of measurements is then conducted by the metrology unit being in "base" mode while attached at the pipeline "base" termination:

The length of the taut wire,
the depth of submergence of the "base" metrology unit,
the entry angle of the taut wire as projected in a generally horizontal plane on the "base" metrology unit, and
in a preferred embodiment, the deviations of the "base" metrology unit from the true horizontal.

After conducting the first "base" half set of measurements, the arrangement of the extended wire and the metrology unit is reversed by means of the ROV, and a "reference" half set of measurements is conducted while the base metrology unit is attached at the opposite, "reference" manifold (or pipeline) termination to replicate the "full" set of measurements:

(The length of the taut wire is the same)
the "reference" depth of submergence of the metrology unit,
the "reference" entry angle of the taut wire as projected in a generally horizontal plane on the metrology unit, and
in a preferred embodiment, the deviations of the "reference" metrology unit from the true horizontal.

The ROV will be controlled to attach the metrology unit with their base-planes preferreably being close to the true horizontal plane. In a preferred embodiment, orientation sensors in the metrology units will measure the deviations from the horizontal. The "light" embodiment takes longer to operate, but replicates through double effort the measurements taken by the "full" embodiment, and thus forms a basis of the "full" embodiment.

On IV: "Mapping" Embodiment

Figure 1B:
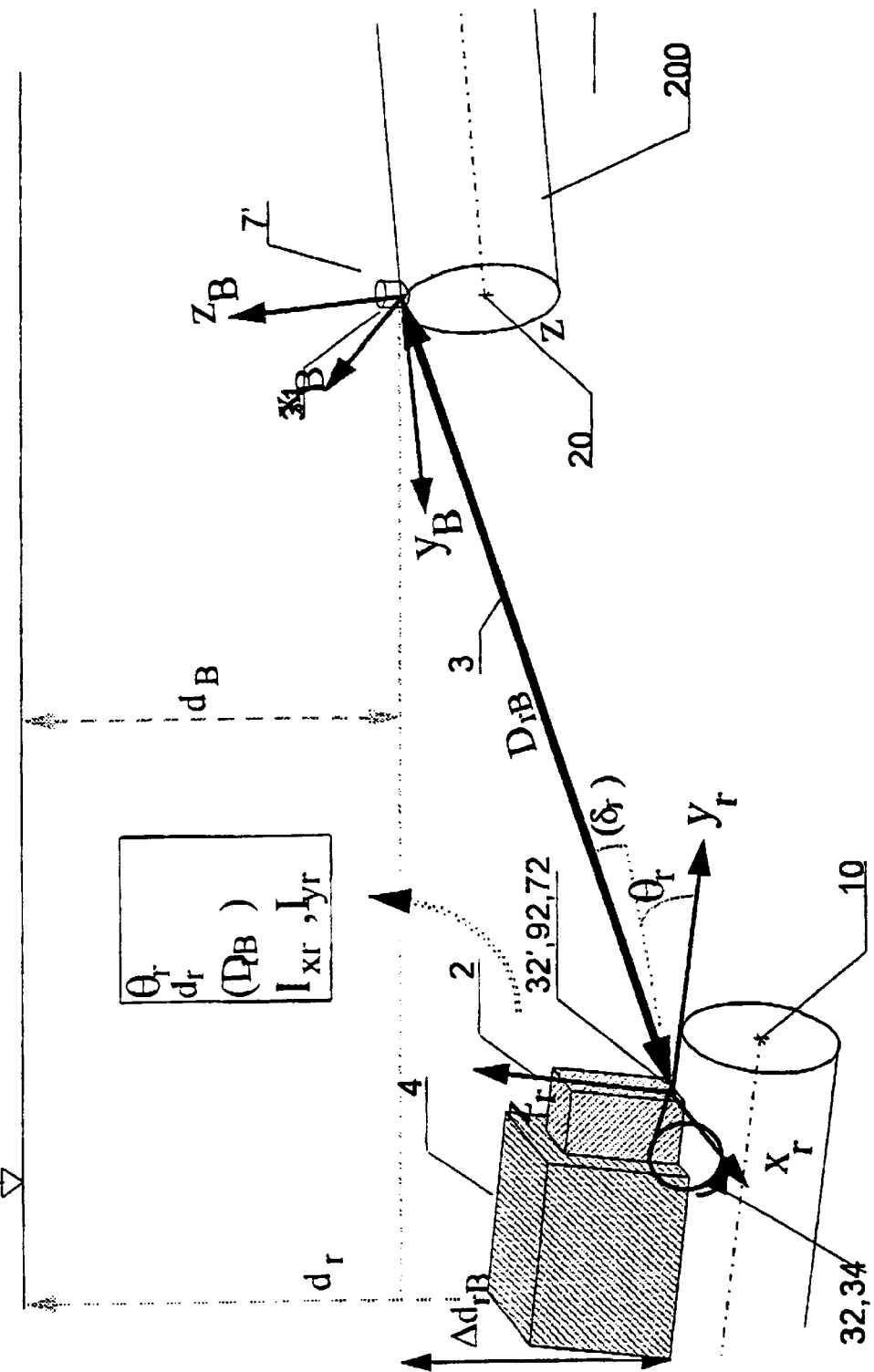
Figure 1C:
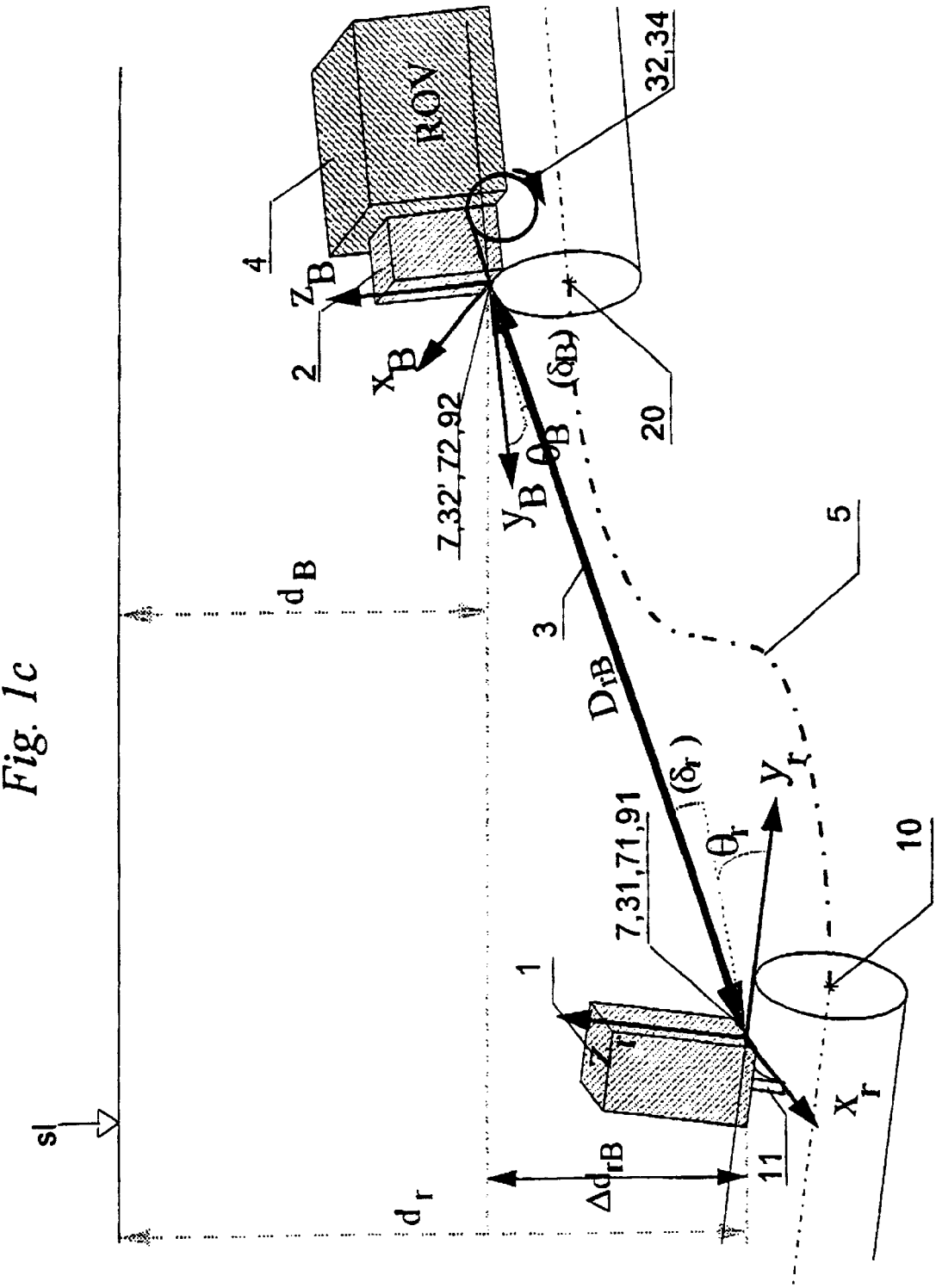
Figure 1D:
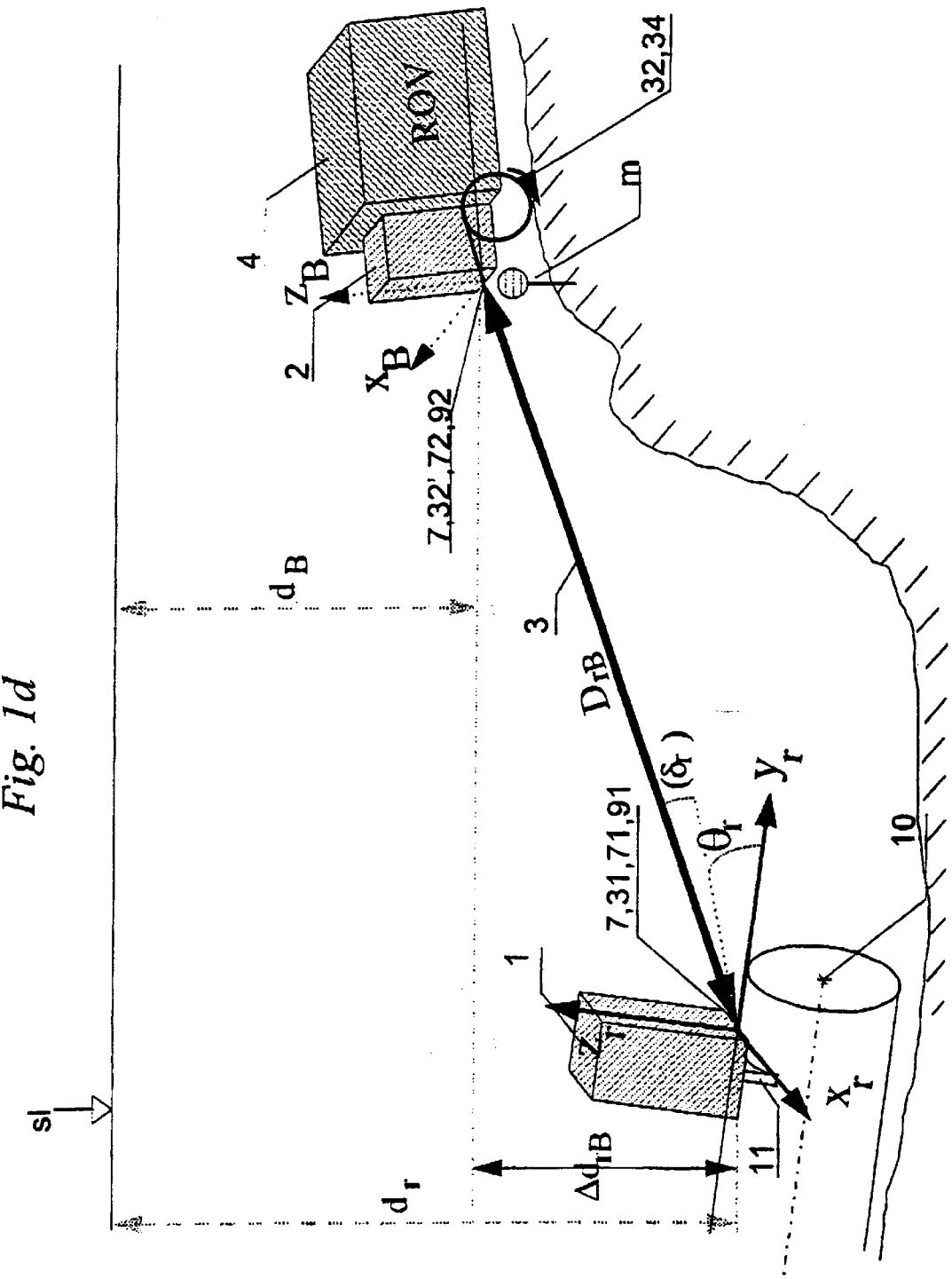

A "mapping" method embodiment is illustrated in FIG. 1d. The mapping method is in a preferred embodiment conducted using a device according to the "full" embodiment using a "reference" metrology unit attached to a manifold (or pipeline) termination playing the role as a "reference" termination in a locally defined reference system for the mapping. A path comprised by points along the topography of the seabed is defined relative to the manifold's termination. In the "online" embodiment as described under point I/II with the full embodiment, successive relative positions of the base metrology unit may be displayed in real-time as the base metrology unit is moved from point to point at the seabed between the two terminations.

Combining in this way the method II with mapping of the seabed according to IV, a jumper spoolpiece may be tailored to the local seabed topography, having correctly oriented terminal connectors and being adapted to a desired degree to fit the local topography between the terminations.

On V: "Positioning" Embodiment

A "positioning" method embodiment is also illustrated in FIG. 1d, using the same device as described for the full version described above under point I. The "positioning" method is conducted using basically the same devices as the "mapping" method, but may regarded as an inverse method to leave markers on the seabed. The markers define landing points for devices, or define new, intermediate, "dead man's anchors" having both position and orientation for extending the working range for the "Smartwire" metrology devices. The positioning method is in a preferred embodiment conducted using a device according to the "full" embodiment using a "reference" metrology unit attached to a manifold's termination defining a reference coordinate system for the positioning and planting of markers. Predetermined points having Cartesian or polar coordinates relative to the manifold's reference coordinate system, and possibly a depth coordinate, are set out one by one at the seabed, and marked, e.g. by a marker buoy or the like. As in the "online" embodiment as described above, the successive relative positions of the ROV carrying the marker buoys may be displayed in real-time as the ROV is moved from the manifold's reference termination to the first point to leave a marker, and later to the successive marking points.

SUMMARY OF THE INVENTION

The above mentioned problems are overcome by a system with a device and a method according to the set of claims, comprising a device for subsea metrology of distance and relative orientation of two terminations, e.g. a manifold's first termination which is to be connected to a pipeline's second termination by means of a jumper spool pipe, the device comprising the following features:

A reference metrology unit arranged for aligned positioning at the first termination;

A base metrology unit;

A wire with its first, extendable end attached to a reference metrology unit, with a wire tensioner drum arranged on a base metrology unit for feeding out and tension the wire, and with a wire length sensor arranged to measure the length of the wire extending between the "reference" and the "base" metrology units. The new features of the invention comprise:

A relative azimuth sensing device in the reference metrology unit, arranged to measure and store the value of the taut wire's relative azimuth with respect to the reference metrology units horizontal axes $(x_r, y_r)$;

a depth sensor arranged on the reference metrology unit for measuring the water depth $d_r$;

that the base metrology unit is arranged to be carried by an ROV at a variable distance from the reference metrology unit and for aligned positioning at the second termination, with a relative azimuth sensing device arranged to measure and store the value of the taut wire's relative azimuth $\theta_B$ with respect to the base metrology units axes $(x_B, y_B)$; and transfer means for transmitting measured values from the reference metrology unit to the base metrology unit.

Advantages of the preferred embodiment will be explained in the detailed description of the preferred embodiment of the invention.

BRIEF DESCRIPTION OF THE DRAWINGS

FIG. 1a is an isometric view of the principle of the basic "half" or "light" version of the device according to the invention, with a metrology device arranged by an ROV at a pipeline's termination, and with a taut wire extended from e.g. a manifolds pipe termination. The purpose of this arrangement is to take a "half" set of distance between terminations, and depth and orientation of one pipe termination.

FIG. 1b is an isometric view of the principle of the corresponding other "half" set of orientation of the other termination to be measured, with the metrology device arranged at the other termination and measuring the complementary depth and orientation, completing a "full" Smartwire set of measurements. The distance would not be necessary to measure twice, except for checking.

FIG. 1c illustrates, as with the previous figures, a complete device for Smartwire metrology comprising a reference metrology unit arranged at the first termination, a base metrology unit arranged at the second termination, connected via a tightable wire reeled out from the base metrology unit.

FIG. 1d illustrates in isometric view and in section of the seabed, a mapping procedure according to an embodiment of the invention, by employing the complete Smartwire device as illustrated above. By this method, polar coordinates of points at the seabed or seabed structures can be measured, comprising a horizontal angle and distance relative to e.g. a manifold frame's coordinate system. In addition, depths can be measured.

Figure 1E:
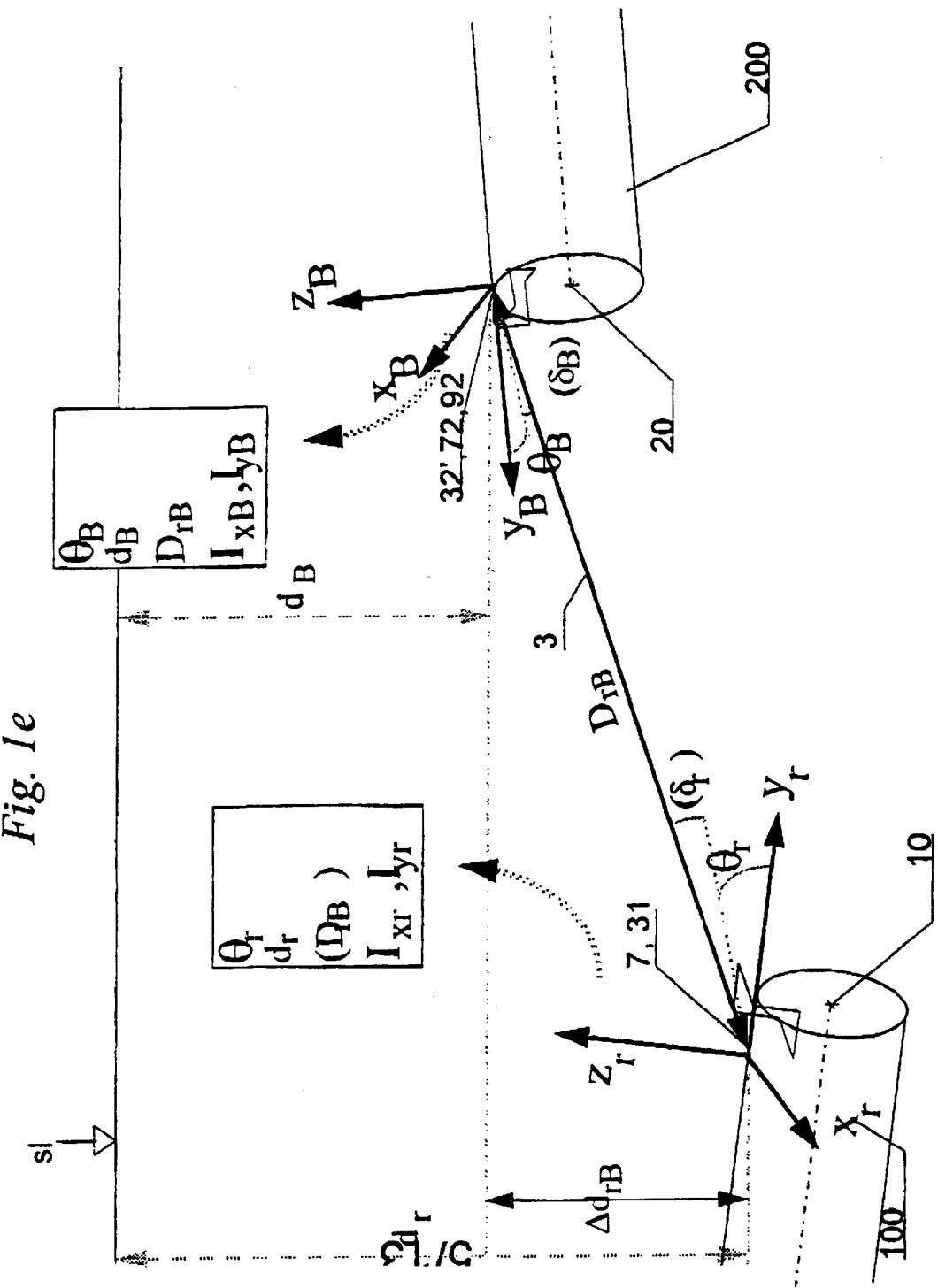

FIG. 1e illustrates the angular, distance and depth parameters which enter into the method for metrology according to the invention.

Figure 2:
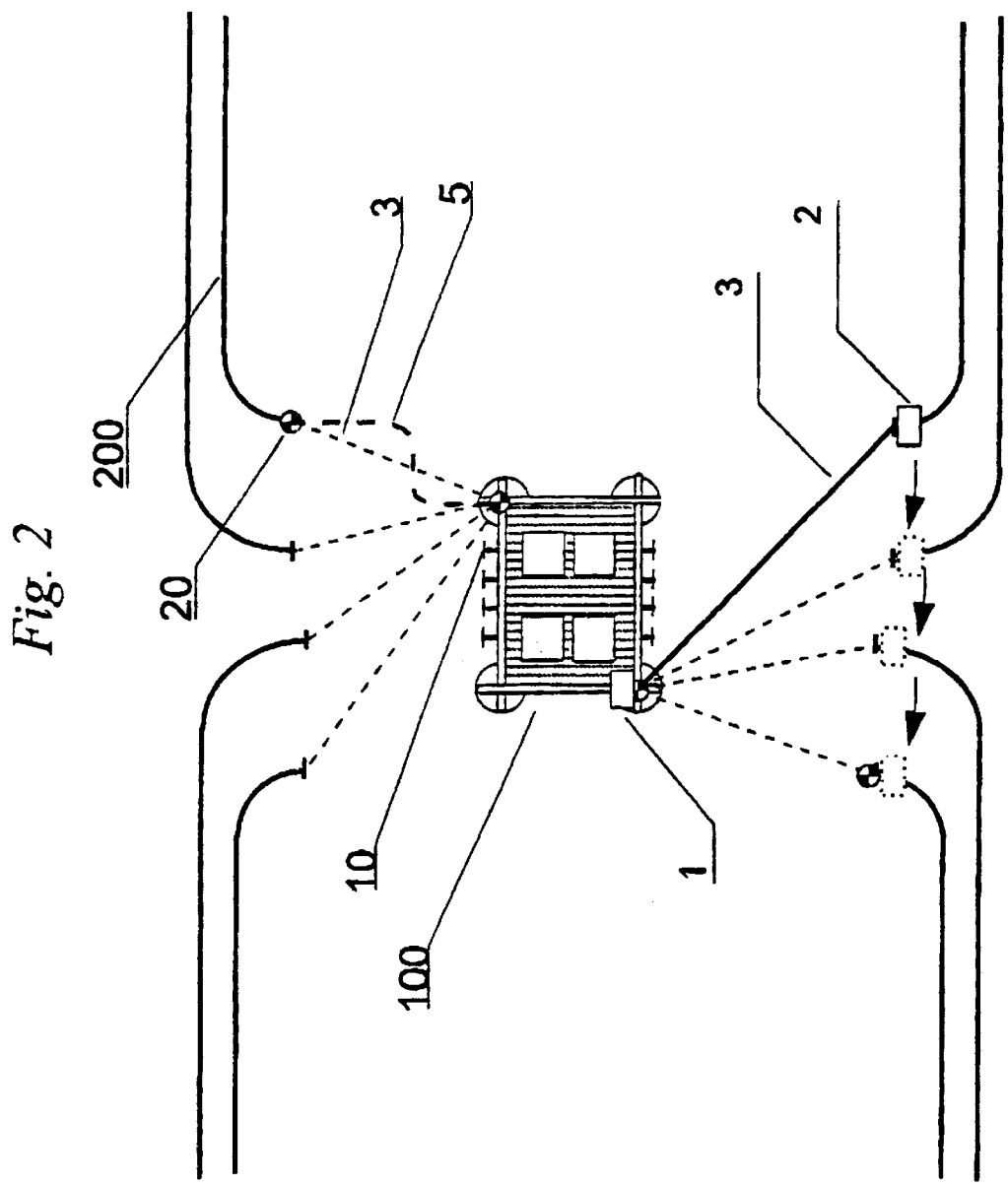

FIG. 2 is a top view of pipelines which are to be connected to a manifold at the seabed. Notice that either structure may be installed first.

Figure 3:
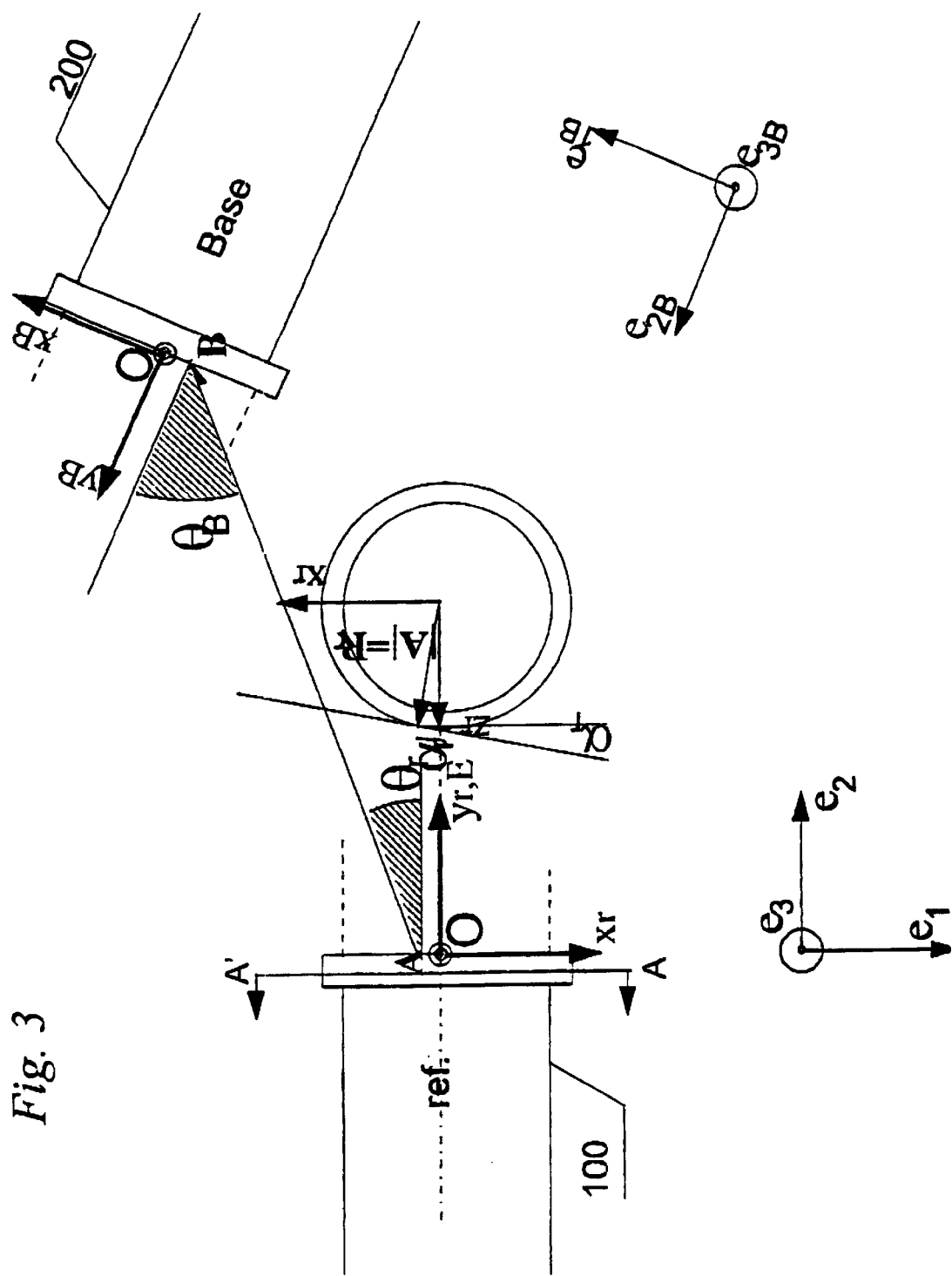

FIG. 3 is a top view of two pipe terminations to be measured; a reference termination called "ref", at e.g. a manifold, and a pipeline termination called "base", together with their corresponding reference systems. In the middle an end view of a reference pipe's 100 termination 10 is shown, with $x_r$ pointing horizontally in that particular end view.

FIG. 3' illustrates rotations defined to facilitate the calculations of the terminations' relative orientations. An imaginary measurement plane on a termination. A normal vector D points in the $z_r$ direction upward with an inclination disalignment $\alpha$ and pitch $\beta$ with respect to the vertical. AB is an imagined vector along the wire. The vectors are defined in the mathematical description below.

Figure 3A:
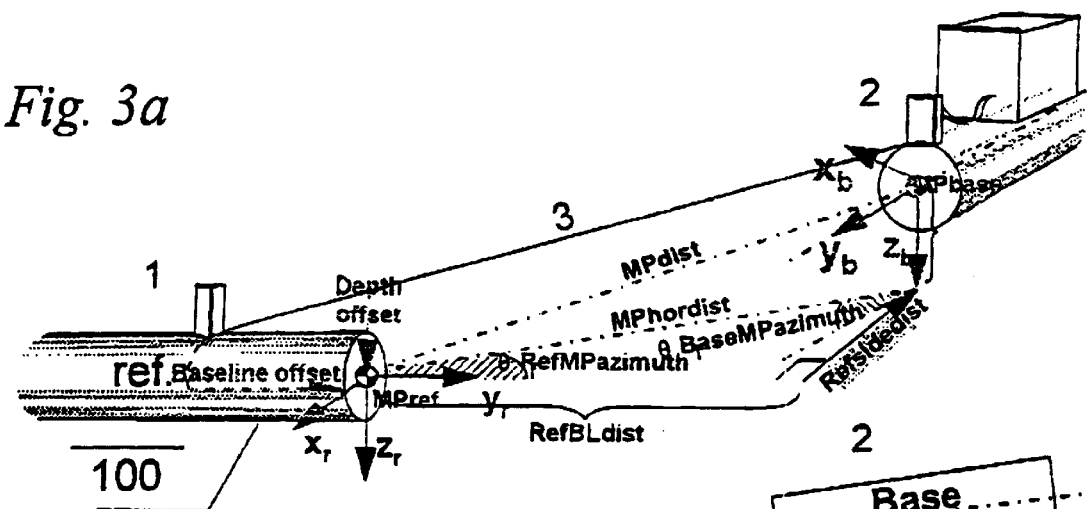

FIG. 3a is an isometric view of two pipe terminations to be measured, and associated reference frames $(x_r, y_r, z_r)$ $(x_B, y_B, z_B)$ for each termination.

Figure 3B:
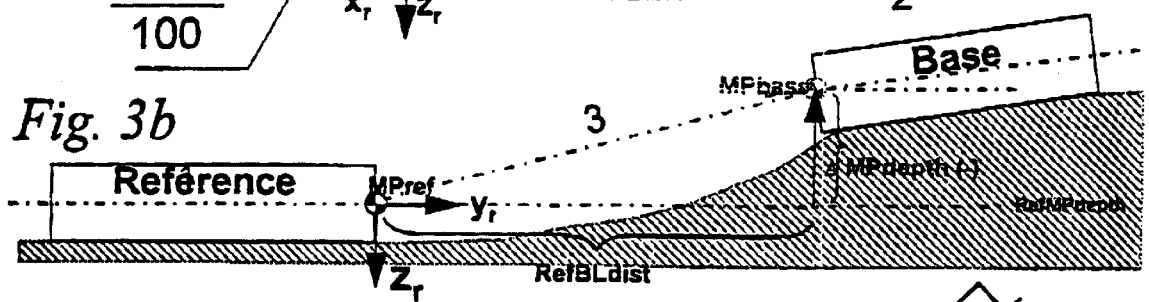

FIG. 3b is an elevation view of the two pipe terminations to be measured.

Figure 3C:
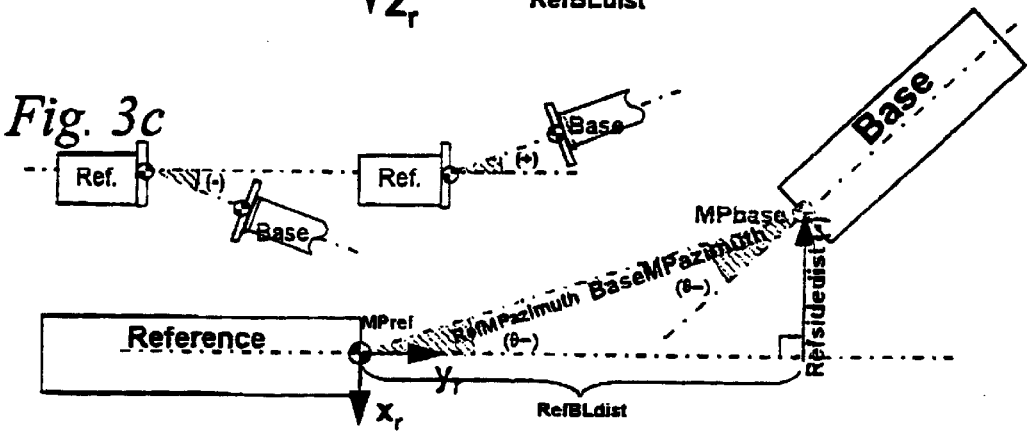

FIG. 3c is a top view of the two pipe terminations to be measured, with their associated horizontal angles.

Figure 3D:
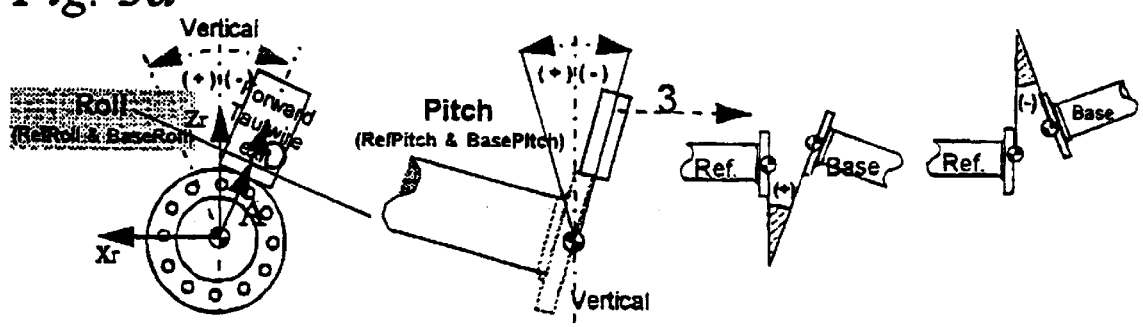

FIG. 3d shows an end view of a pipe termination and definitions of the angles "roll" or vertical disalignment α and "pitch" β.

FIG. 4a illustrates a preferred embodiment of the device according to the invention, showing a front elevation view of a metrology unit, a top view and a side elevation view also added a wire. Examples of horizontal and vertical entry angles for the wire trailing arm are illustrated.

FIG. 4b is a section view of a seabed and two pipe terminations to be undertaken metrology, each termination with one metrology unit and an ROV assisting the metrology operation.

Figure 5A:
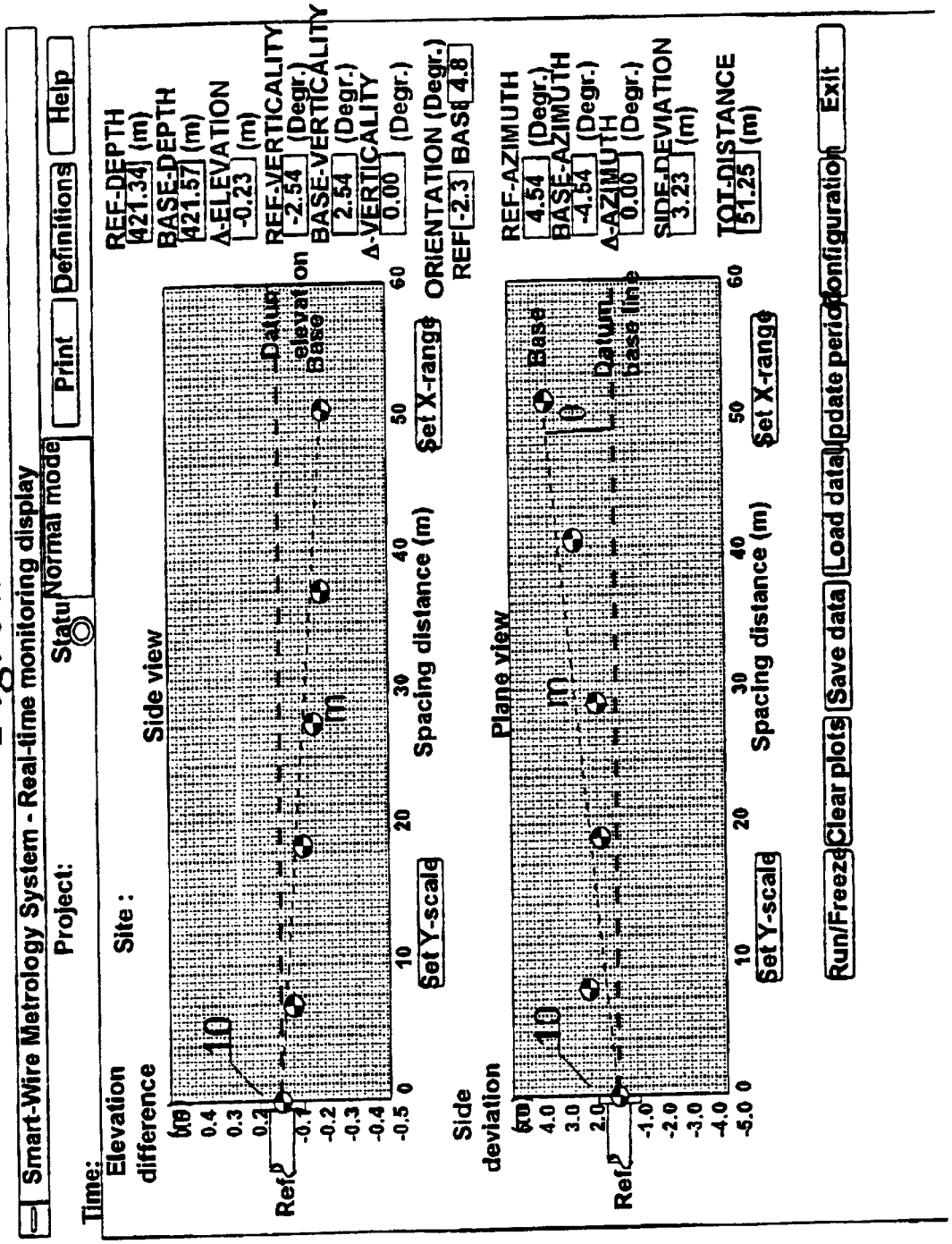

FIG. 5a is an illustrated view of metrology data displayed in real-time online during the metrology operation. Such a display is normally arranged in a surface vessel 8.

FIG. 5b is an elevation view similar to FIG. 4b, showing an additional imagined display of data according to FIG. 5a, and also illustrating connection to a computer making CAD-drawings of a spoolpiece "(5)" to be produced according to the conducted metrology at the terminations at the seabed.

SPECIFICATION OF THE PREFERRED EMBODIMENTS OF THE INVENTION

As mentioned in the introductory paragraphs, the invention may be embodied both as a device in a basic and fuller version, and at least three methods for subsea metrology:

I: A "full Smartwire" device embodiment;

II: A "Smartwire" method embodiment;

III: A "light" Smartwire device embodiment;

IV: A "mapping" method embodiment.

V: A "positioning" method embodiment.

Because the basic or "light" device embodiment (no.III) can be developed into the full device embodiment (no.I), the basic embodiment is described first:

III: A "Light" Smartwire Device Embodiment

FIG. 1a illustrates a simplified or "light" embodiment of a device for subsea metrology of distance and relative orientation of e.g. a manifold 100 having a first or "reference" termination 10 with a local reference system $(x_r, y_r, z_r)$, and which by means of a jumper spool piece 5 is going to be connected to e.g. a separate pipeline's 200 second termination 20. The termination 20 is here given a local reference system $(x_B, y_B, z_B)$.

Such terminations 20,10 normally comprise a plate-shaped flange with axially oriented bolt holes distributed at a common radius with even angular separation around the termination's axis, as shown in FIG. 3d and FIG. 4b. Normally each termination 10,20 is closed during the metrology procedure.

A base metrology unit 2 is arranged for being carried by an ROV 4. The base metrology unit 2 is arranged for aligned arrangement with at least one of the base or the reference termination's 20,10 reference system. The novel features of an embodiment of the invention are the following:

A wire 3 has an extractable first end 31 being arranged for being attached to a receptacle device 7,7' arranged on the termination 10,20 for receiving the wire's 3 first end 31 or a metrology unit and with a wire tensioner device 32 arranged for tensioning the wire 3 between the base metrology unit 2 and the receptacle device 7,7'. The receptacle device 7 or 7' may be flange bolts on the termination's 20,10 flange. For the practical arrangement of the metrology unit on the termination, a ROV handle 11,12 may be arranged on the metrology units 1,2. The ROV handle 11,12 may be handled by means of an ROV manipulator arm to control a clamping device 11'12' arranged on the metrology unit 2 for fixing the metrology unit to one termination 10,20. In the preferred embodiment the clamping device 11',12' is arranged to attach to the flange bolts of the pipes, as these flange bolts have fixed and known positions.

A wire length sensor 34 is arranged for measuring the length $D_{rB}$ of the extended taut wire 3 extending between the "reference" and the base metrology units 1,2. In a preferred embodiment a wire drum 32 is arranged on the base metrology unit 2 for feeding out and for tensioning the wire 3. In the preferred embodiment the wire drum 32 contains one single layer of approximately 100 meters of wire 3. In this way the extended wire length is proportional to the total angular turn of the wire drum 32.

A relative azimuth sensing device 92 is arranged to measure and store the relative azimuth $\theta_B, \theta_r$ value of the taut wire 3 with respect to the base metrology unit's 2 mainly horizontal axes $x_B, y_B$. In a preferred embodiment of the invention illustrated in FIG. 4a, a stiff but pivoted wire-keeping arm 32 comprises the wire's 3 running end-point 32'. The wire-keeping arm is pivoted around a single point 32' and is arranged to swing freely to trail the wire's direction in both the horizontal and vertical planes in the base metrology unit 2. The arm 32 is connected with the azimuth sensing device 92, in the preferred embodiment being an angular encoder. The wire's azimuth sensing device 92 may be embodied by other angle measuring devices such as acoustic, magnetic or dielectric sensors. In the preferred embodiment, no angular encoder is arranged to measure the wire's angle in a vertical plane. This is due to at least two facts: The hydrostatic pressure during seabed operations may be large, so the sealing devices for an angular decoder is rather bulky for the operating depths required. Thus an additional angular encoder operating orthogonally with the existing one constituting the azimuth sensing device 92 could be bulky. In addition, it will be shown below that with the parameter set to be measured, the wire's 3 vertical angle is not required. The final essential part of the basic device is the following:

A submerged-depth sensor 52 being arranged for measuring the submerged depth $d_B$ of the base metrology unit 2.

For online operation, a transfer means is provided for transmitting the measured values of at least the submerged depth value $d_B$ and the relative azimuth value $\theta_B, \theta_r$ from the base metrology unit 2 to the ROV 4.

In a preferred embodiment, the measured values are transferred serially to the surface vessel 8 via an ordinary ROV umbilical 81. Further transfer of measurements to a surface vessel 8 is described below.

In a preferred embodiment, the wire 3 is given tension by means of a wire tensioner 32. A wire tensioner termination point 320 may define the origin 32' of the three-axis reference system of the base metrology unit 2. The termination point 320 may in a preferred embodiment comprise the mouth of a flexible wire hose 322 arranged between the origin 32' of the three-axis reference system of the base metrology unit 2 and the wire tensioner 32 arranged at the ROV 4. The flexible wire hose 322 will transfer the longitudinal forces of the cable. The wire drum 32 has in a preferred embodiment an angle encoder 34 for counting the angular turn and number of complete turns of the drum.

II: A "Smartwire" Method Embodiment

A method for subsea metrology according to the invention comprises the following steps:

By means of the ROV 4, the wire 3 is extended from the receptacle device 7. The receptacle 7 has a known position in the local reference system $(x_r, y_r, z_r)$ relative to the first or "reference" termination 10. The wire 3 is then extended to the receptacle device 7' in the local reference system $(x_B, y_B, z_B)$ relative to the second termination 20.

The wire 3 is then tensioned. In a preferred embodiment of the invention, the wire 3 is tensioned by the wire drum 32 arranged on the base metrology unit 2.

The extended taut wire length $D_{rB}$ is then measured. In a preferred embodiment of the invention, the wire length sensor 34 measures length $D_{rB}$ of the extended taut wire 3.

The submerged depth $d_B$ of the second termination 20 is measured. In a preferred embodiment of the invention the submerged-depth sensor 52 measures the submerged depth $d_B$ of the base metrology unit 2.

The tensioned or "taut" wire's 3 relative azimuth $\theta_B$ is then measured in the plane defined by the metrology unit's 2 mainly horizontal axes $(x_B, y_B)$ (the base-plane of the metrology unit) while connected to the second termination 20, as illustrated in FIG. 1a, FIG. 1e, FIG. 3 or FIG. 3c. In a preferred embodiment of the invention illustrated in FIG. 4a, a stiff but pivoted wire-keeping arm 32 comprises the wire's 3 running endpoint 32'. The wire-keeping arm 32 is coupled to the relative azimuth sensing device 92 which measures the relative azimuth $\theta_B$.

Then follows the measurements with the metrology unit arranged at the other termination, here called the "reference" termination 10, as illustrated in FIG. 1b. In this embodiment of the device the setup above is reversed for conducting the complementary part of the measurements with the base metrology unit 2 being arranged at the receptacle 7 at the "reference" termination 10 and having extended and tightened the wire 3 from the receptacle 7' at the "base" termination 20. The submerged depth $d_r$ of the reference termination 10 is measured. The depth measurement $d_r$ is conducted with the same submerged-depth sensor 52 in the "light" version of the invention, although $d_r$ may be measured by other, more elaborate means as will be described below under the "full" Smartwire device version.

The taut wire's 3 relative azimuth $\theta_r$ is measured in the the metrology unit's base-plane mainly horizontal axes $(x_r, y_r)$ while attached to the first termination 10. This relative azimuth measurement $\theta_r$ may be conducted by the same azimuth sensing device 92 in the basic device embodiment, or by more elaborate means as will described below in the "full" version.

By using the following measured values:

$\theta_B$ and $\theta_r$: the taut wire's 3 relative azimuths, $D_{rB}$: the extended wire length, $d_B, d_r$: the submerged depth values, the relative position and orientation of the second termination 20 in the reference system $(x_r, y_r, z_r)$ of the reference termination 10 may be calculated, and the metrology method may be regarded as completed. The calculations may be conducted in several ways, and one preferred method for the calculations is left for a separate chapter of this description.

In the method described above, it is assumed that the metrology unit 1 is arranged essentially with its mainly horizontal axes near to the true horizontal plane while being arranged at the "base" termination 20, and similarly near to the true horizontal plane while measuring at the "reference" termination 10. Small deviations from the true horizontal may be neglected, but larger deviations may reduce the needed precision of the method. In order to keep a high precision of the method, the preferred embodiment of the method according to the invention involves measurement the horizontal axes' $(x_B, y_B)$ inclination values $(Ix_B, Iy_B)$ at the "base" termination 20 and the corresponding inclination values $(Ix_r, Iy_r)$ at the "reference" termination 10, with respect to the true horizontal plane. The $(Ix_B, Iy_B)$ and and $(Ix_r, Iy_r)$ measurement may be conducted by means of inclination sensors 72x, 72y arranged in the metrology unit 2 in the basic version of the invention. The inclination values may be measured by other means by the ROV as it has attached the metrology unit 2 on the termination 20,10. The inclination values $(Ix_r, Iy_r)$ may be measured by additional means comprised by the "full" Smartwire embodiment described below.

The inclinations $Ix_B, Iy_B$ with respect to the horizontal plane may be used for adjusting the readings of the wire's 3 azimuthal angle $\theta_B$ with respect to the base metrology unit's 2 horizontal axes $(x_B, y_B)$ into a true relative azimuthal angle $\theta_{B\ true}$, in one embodiment with respect to a reference axis $x_{B1}$ pointing normal to the pipe's end 20 and being truly horizontal.

I: A "Full" Smartwire Device Embodiment

FIG. 1c illustrates an isometric simplified view of a full smartwire embodiment arranged at terminations 10,20 at the seabed. This device includes the "basic" device according to the description above, and is provided with an additional "reference" metrology unit 1 also arranged to be carried by the ROV 4. The reference metrology unit 1 is attached to the wire's 3 first extendable end 31. The reference metrology unit 1 further comprises the following features:

A relative azimuth sensing device 91 arranged to measure and store the value of the taut wire's 3 relative azimuth $\theta_r$ with respect to the reference metrology unit's 1 horizontal axes $(x_r, y_r)$.

A submerged-depth sensor 51 arranged on the reference metrology unit 1 for measuring the submerged depth $d_r$.

This completes a minimum configuration of a "full" Smartwire metrology device with two metrology units 1,2 and a wire 3 arranged between.

According to a preferred embodiment of the invention, non-parallel, preferably orthogonal inclination sensors 71x, 71y are arranged to measure inclinations $Ix_r, Iy_r$ of the horizontal axes $(x_r, y_r)$ of the reference metrology unit 1, with respect to the true horizontal plane, as explained above for the base metrology unit 2. In the same way, the inclinations $Ix_r, Iy_r$ may be used to adjust the readings of the wire's 3 azimuthal angle $\theta_r$ with respect to the metrology unit's horizontal axes $(x_r, y_r)$ into a true relative azimuthal angle $\theta_{r\ true}$ in one embodiment with respect to the reference axis $x_{r1}$ pointing normal to the manifold hub 10 (as with the base termination 20) and is truly horizontal.

According to a preferred embodiment of the invention there is provided transfer means 33 arranged to transfer of measured values from the reference metrology unit 1 to the base metrology unit 2. The transferred values comprise at least the submerged depth $d_r$, and the relative azimuth $\theta_r$, and preferrably also the inclinations $Ix_r, Iy_r$. In an online operation, these values will be transferred to a surface vessel 8 for online calculations in a computer 8 on board the vessel, as illustrated in FIG. 5b.

The transfer means 33 comprises in the preferred embodiment a hydroacoustic transmitter 330a arranged on the metrology unit 1 and a corresponding hydroacoustic receiver 330b arranged on the metrology unit 2. The transfer means 33 transfers the values $d_r$ of the depth measurement, the relative azimuth $\theta_r$ and the inclinations $Ix_r, Iy_r$ from the "reference" metrology unit 1 to the base metrology unit 2 residing on the ROV.

In an alternative embodiment, the transfer means 33 comprise a cable transmitter 332a (not shown) arranged on the metrology unit 1 and a cable receiver 332b (not shown) arranged on the metrology unit 2 via cable means 332 (not shown) for transferring the measured values from the "reference" metrology unit 1 through the wire 332 to the base metrology unit 2 on the ROV.

The reference metrology unit 1 is arranged for aligned positioning at the first termination or hub 10 in the same way as for the base metrology unit 2; The unit 1 may be attached to the a receptacle 7,7' arranged at a pipe's 100 termination 10 by a clamping unit 11 which will be described below.

The depth sensor 52,51 may in a preferred embodiment comprise a pressure sensor and an electronic device arranged for transforming the pressure reading into a depth reading. The water depth measurements may be used to calculate the absolute elevation difference $\Delta d_{Rb}$ between the two metrology units 1,2 and is described in the mathematical section below.

In this preferred embodiment of the invention, the relative asimuth sensors 92,91 are arranged to measure the tautwire's 3 relative azimuth 74 $_B$, $\theta_r$ in their respective baseplanes $(x_B, y_B)$, $(x_r, y_r)$ with respect to the metrology devices's 2,1 $y_B, -y_r$-axis, respectively. All the measurements made by the two metrology units 2,1 may be conducted simultaneously, thus the ROV operation time may be halved compared to an operation using the basic device with only one single base reference unit 1 attached first to one termination 20,10 and then turned and attached to the other termination 10,20. More than this, the reference metrology unit 1 may reside on one termination 1 at the manifold, and the base unit 2 may be moved from pipeline termination 20 to successively other terminations 20 to conduct a series of metrology of all terminations 20 in one run.

The relative azimuth sensing devices 91,92 comprise in a preferred embodiment of the invention angular decoders 921 for digital encoding of the sensed angle $\theta_B$, $\theta_r$.

The Subsea Operation Using the Full Device

The subsea operation for conducting the method is as follows, with reference to FIG. 1c: The ROV 4 carries the reference metrology unit 1 to e.g. the manifold frame 100 and hangs off and installs the reference metrology unit 1 on the "reference" termination 10 or hub on the seabed manifold frame 100. The termination 10 according to the invention is not limited to be a pipe termination or hub, but comprises any predetermined fixed part which has an orientation and position that can be defined on a seabed structure or manifold 100. The ROV then separates from the reference metrology unit 1, and preferrably backs away from the termination 10 having the wire 3 winding out from the wire tensioner drum 32. The ROV then carries the base metrology unit 2 to an independently arranged or "base" pipeline termination 20 being subject for the metrology, and aligns with that base termination 20 according to vector direction definitions given below. Having attached to the respective terminations 10,20, the measurements are conducted according to paragraph II: "A Smartwire method embodiment" above. The orientations of the terminations 10,20 are then calculated along the mathematical outline given below.

A simple algorithm according to the invention comprises means (not shown) for calculating the real inclination of the taut wire 3 and is based on the depth difference $\Delta d_{Rb}$ between the reference depth sensor 51 reading $d_r$, a second depth sensor's 52 reading $d_B$ from the base metrology unit 2, and the extended wire length $D_{Rb}$ between the "reference" and the base metrology units 1,2. The calculation means may be included in an algorithm of a computer program residing in a computer 80 either in the ROV or in a surface vessel 8 or onshore.

(In an alternative embodiment of the invention, the ROV's own depth sensor may be used for the depth sensor 52, but that alternative may not be the optimum implementation of the preferred embodiment of the invention, as the pressure difference or the depth difference $\Delta d_{Rb}$ between the first depth sensor 51 reading $d_r$ and the second depth sensor's 52 reading $d_B$ is required in the calculations, not the absolute pressure or depth. Thus the depth sensors 51 and 52 should be of the same make and with the same calibration and sensitivity gradient.)

According to a preferred embodiment of the invention, the device comprises means for transmitting the following parameters to a vessel 8 at the surface:

the reference metrology unit's 1 horizontal axes' $(x_r, y_r)$ inclination values $Ix_r, Iy_r$ with respect to the horizontal plane;

the taut wire's 3 relative azimuth value $\theta_r$ with respect to one of the reference metrology units 1 axes $(x_r, y_r)$;

the base metrology unit's 2 horizontal axes' $(x_B, y_B)$ inclination values $Ix_B, Iy_B$ with respect to the horizontal plane;

the taut wire's 3 relative azimuth value $\theta_B$ with respect to one of the base metrology units 2 axes $(x_B, y_B)$;

the taut wire length value $D_{Rb}$.

An algorithm implemented in the preferred embodiment, for calculating the inclination $I_w$ of the taut wire (3) with respect to the horizontal plane, will be according to the formula:

$$I_w = \arctan\left(\frac{d_r - d_B}{D_{rB}}\right)$$

The relative asimuth sensor 91 is arranged to measure the taut-wire's 3 relative azimuth $\theta_r$ in the base-plane $(x_r, y_r)$ with respect to the metrology unit's 1 $x_r$-axis.

Shown in FIG. 4a, a stiff wire-keeping arm 31' constitutes the wire's 3 end 31, pivoted around a single point 31 swinging freely in two planes in the reference metrology unit 1, and being connected with the azimuth sensing device 91.

IV: A "Mapping" Method Embodiment

The ROV 4 may make a relative seabed mapping by setting down on points along a path on the seabed. A device at the seabed, e.g. the manifold 100 is given a defined reference system. Each relative position of points visited at the seabed by the ROV may be given a distance and horizontal direction in the reference system $(x_r, y_r, z_r)$ of the manifold 100.

The "mapping" method embodiment is illustrated in FIG. 1d. The mapping method is in a preferred embodiment conducted using a device according to the "full" embodiment using a "reference" metrology unit 1 attached to a manifold's 100 termination hub 10.

The method for mapping of a subsea surface, e.g. the seabed or a fixed structure, comprises conducting the following steps at least once:

The wire 3 is extended between a receptacle device 7 having a known position in the local reference system $(x_r,y_r,z_r)$ relative to a first termination 10, and an ROV 4 situated at a freely selectable point of the surface, and tensioning the wire 3.

The extended taut wire length $D_{rB}$ is then measured, preferably at the ROV 4.

Preferably, the submerged depth $d_B$ of the ROV 4 is then measured. The depth $d_B$ is not essential for the horizontal position of the ROV 4.

The taut wire's 3 relative azimuth $\theta_r$ is measured in the plane of the first termination's 10 mainly horizontal axes $(x_r,y_r)$;

The measured value of relative azimuth $(\theta_r)$ to the ROV (4) is then transmitted.

The following measured values:
  $\theta_r$: the wire's 3 relative azimuth,
  $D_{rB}$: the extended wire length, and
  $d_B$: the submerged depth value,
are used to calculate, by means connected to the ROV 4, the relative position of the ROV 4 in the reference system $(x_r,y_r,z_r)$ of the first termination 10. The relative positions calculated are then used to produce a preferably topographic map representation, either as a visual map or a map representation in a computer stored memory.

In the "online" embodiment illustrated in FIG. 5a and 5b, successive relative positions of the base metrology unit are displayed in real-time as the ROV carrying base metrology unit 2 moves from point to point at the seabed between the two terminations. A side view may illustrate the vertical positions along the path, and a plane view may illustrate the measured positions, x-y coordinates along the path. Combining in this way the metrology method II with mapping of the seabed according to IV, a jumper spoolpiece 5 may be "tailored" to the local seabed topography, having correctly oriented terminal connectors and being adapted to a desired degree to fit the local topography between the terminations 10,20.

V: A "Positioning" Method Embodiment

The "positioning" method embodiment of the invention is also illustrated in FIG. 1d. Preferably the same device is used, described as the "full" device described above, as for the "mapping" method. Positioning may be regarded as the inverse method, used for leaving markers "m" on the seabed. The markers m define points for devices to be landed at the seabed, or the marker points m define new, intermediate, "dead man's anchors" having both position and orientation for extending the working range for the "Smartwire" metrology devices. The positioning method is in a preferred embodiment conducted using a device according to the "full" embodiment using a "reference" metrology unit attached to a manifold's 100 termination or hub 10 defining a reference coordinate system $(x_r,y_r,z_r)$ for the positioning and planting of markers m. Predetermined points are defined by Cartesian or polar coordinates relative to the manifold's reference coordinate system. Possibly a depth coordinate is defined if the seabed is mapped, e.g. as described above.

These points are then set out one by one at the seabed, and marked, e.g. by a marker buoy m or the like. As with the "online" embodiment as described above, the successive relative positions of the ROV carrying the marker buoys m may be displayed in real-time as illustrated in FIG. 5a, as the ROV 4 is moved from the manifold's 100 reference termination 10 to the first point to leave a marker m, and later to the successive marking points and eventually possibly to a base termination 20.

According to the invention, the method for positioning at a subsea surface, e.g. the seabed or a fixed structure, comprises conducting the following steps at least once:

a) Define a desired position, comprising at least its relative polar coordinates, as
  $\theta_{rd}$: the desired relative azimuth of a taut wire's 3, and
  $D_{rBd}$: the desired extended wire length, to command the desired relative position of an ROV 4 in a local fixed reference system $(x_r,y_r,z_r)$ of a first termination 10.

b) Extend the wire 3 between a receptacle device 7 having a known position in the local reference system $(x_r,y_r,z_r)$ relative to a first termination 10, and the ROV 4. Put the wire 3 under tension to keep it straight enough.

c) Measure the taut wire's 3 relative azimuth $\theta_r$ and the extended wire length $D_{rB}$ to calculate the polar coordinate difference $(\theta_r-\theta_{rd}, D_{rB}-D_{rBd})$ between the desired relative position and the measured relative position of the ROV 4.

d) Move the ROV 4 in order to minimize the position difference.

Repeat steps (c) and (d) until the position difference is small enough, and mark off the desired position at the surface, e.g. by a marker buoy (m).

According to a preferred embodiment of the invention, the desired submerged depth value $d_{Bd}$ is taken into consideration in step (a). Also the submerged depth value $d_B$ is considered in the measurement in step (c).

According to a preferred embodiment of the invention, a cross-check may be conducted according to the following procedure:

Give the same desired position's relative polar coordinates as a desired relative azimuth $\theta'_{rd}$ and extended wire length $D'_{rBd}$ to command the desired relative position of the ROV 4 relative to another termination or hub 10b in the same local fixed reference system $(x_r,y_r,z_r)$. The other termination 10b has a known position and orientation with respect to the first termination 10.

b) Similar to the above method, extend the wire 3 between a receptacle device 7b having a known position in the local reference system $(x_r,y_r,z_r)$ relative to the termination 10b. Move the ROV 4 to the position marker (m). Tension the wire 3.

c) Measuring the taut wire's 3 relative azimuth $\theta'_r$, the extended wire length $D'_{rB}$ to calculate the polar coordinate difference $(\theta'_r-\theta'_{rd}, D'_{rB}-D'_{rBd})$ between the desired relative position and the measured relative position of the ROV 4.

Mathematical Outline of the Metrology Calculations

We wish to show, that given the parameters measured by the metrology units 1 and 2 as described in the method for metrology in a previous paragraph, these parameters shall sufficient to make a geometrical description of a rigid jumper spoolpiece of given length and termination angles in three dimensions fitting to the terminations 10 and 20.

Referring to FIG. 3, the elevation difference between points A and B is $\Delta h_{Rb}$ ($\Delta d_{Rb}$). The origin $O_r$ is the center end of the "reference" hub flange 10 at the manifold 100. In the "full" smartwire method, the reference metrology unit 1 is arranged at the hub 10. In the "basic" device embodiment, the base metrology unit 2 is arranged at the hub 10. The $Z_r$-axis is defined positive upward, the $x_r$-axis horizontal and rectangular to the pipe. The $y_r$-axis is positive along the center of the pipe and pointing out of the pipe. Similarly the origin $O_B$ is the center end of the pipe termination flange 10 at the "base" pipeline 200 and associated with the base metrology unit 2. The $z_B$-axis is positive upward, the $x_B$-axis is horizontal and perpendicular to the pipe. The $y_B$-axis is similarly positive along the center of the pipe 200 and pointing out of the termination 20.

Imagine the wire entry point at the metrology unit being arranged at a radius $R_r$ above $O_r$. We define this entry point as vector A; $|A|=R_r$. The entry point A and the base plane of the reference unit (1) will usually have a slight "roll" $\alpha_r$ to either side of the pipe, depending on the fixation method, either setting in a receptacle or connecting to flange bolts or other fixation of the metrology unit. The base plane of the reference unit (1) and the pipe also has a "pitch" inclination $\beta_r$, see FIG. 3 and FIG. 3d. A similarly defined point B is defined at the base pipe, with roll $\alpha_B$ and pitch inclination $\beta_B$. In the preferred embodiment inclination sensors 71x, 71y arranged to register the reference metrology unit's 1 horizontal axes' $(x_r, y_r)$ inclinations $(Ix_r, Iy_r) = (\alpha_r, \beta_r)$. with respect to the true horizontal plane. Similarly, inclinometers measure inclinations $(Ix_B, Iy_B) = (\alpha_R, \beta_R)$ at the base unit 2.

Let the vector AB be defined by an imaginary straight wire extending from A to B.

Unit vectors $e_{1r}, e_{2r}, e_{3r}$ are defined with $e_{3r}$ upwards along the true vertical z-axis, $e_{2r}$ pointing along a true horizontal y-axis along the projection of the pipeline termination's 20 axis, and $e_{1r}$ along an x-axis horizontal athwart of $e_{2r}$, being $e_{2r} \times e_{3r}$. We express vector A as A=[Ax, Ay, Az], with components along the xr, yr, zr, with $\beta_r = 0$, e.g. no inclination of the pipe, $$A = [-Rr \sin \alpha_r, 0, Rr \cos \alpha_r] = [Ax1, Ay1, Az1]$$

In the general case, $\beta_r <> 0$:

$$A = [-Rr \sin \alpha_r, Az1 \sin \beta_r, Az1 \cos \beta_r] = [-Rr \sin \alpha_r, Rr \cos \alpha_r \sin \beta_r, Rr \cos \alpha_r \cos \beta_r]$$

$$A = Rr[-\sin \alpha_r, \cos \alpha_r \sin \beta_r, \cos \alpha_r \cos \beta_r]. \quad (1)$$

Now refer to FIG. 3': rotations. We define D, a unit vector $$D = A/|A| = A/Rr.$$

$$D = [-\sin \alpha_r, \cos \alpha_r \sin \beta_r, \cos \alpha_r \cos \beta_r].$$

We also define E, a unit vector parallell with the centerline of the reference pipe, pointing out of the pipe.
With $\beta_r = 0$,
E=[0, 1, 0]
Generally, $\beta_r <> 0$, thus $$E = [0, \cos \beta_r, -\sin \beta_r]. \quad (2)$$

In this paper $\beta_r$ is defined as positive downwards from the horizontal.

We now define a measurement plane F as the plane being normal to the vector A and comprising the point A, the endpoint 31 of the taut-wire 3. In a simplified illustrations, we can imagine the vector A ending at the outer edge of the pipe, with radius Rr from the pipe centerline. In practical applications one must correct for offset of the metrology units (1) and (2) along the pipe, away from the end, as will be described later.

Let P be a unit vector being the projection of the vector AB (the wire 3) in the measurement plane F. Let $u(\Gamma)$ be a unit vector in a plane defined by P and D, such that the angle from P to $u(\Gamma)$ is $\Gamma$. That is:

$$u(\Gamma) \cdot P = \cos \Gamma.$$

Thus there exists an angle $\Gamma$ so that $|AB|u(\Gamma) = m\, u(\Gamma) = AB$. The scalar m is the length of AB. We name the angle $\Gamma$ satisfying the equation $\Gamma_0$ that is:

$$m\, u(\Gamma_0) = AB.$$

We then define a new reference system based on the vectors p1 E, DxE, D.
(E is thus [1,0,0] in this new system) The purpose of this new reference system is to enable us more easily to rotate E with an angle $\gamma$ about D through A. $\gamma_r$ is the same as angle $\theta_r$ measured by the "azimuth sensing device" 91 measured in the base plane of metrology unit 1.

The vector P defined above may thus in this new reference system be represented by:

$$P = [\cos \gamma_r, \sin \gamma_r, 0]$$

$$P = \cos(\gamma_r)E + \sin(\gamma_r)(DxE) + 0D \quad (3)$$

Let us then find $u(\Gamma)$ for any angle $\Gamma$:
We define a new reference system; see FIG. 3': "rotations"
P, D, PxD.
This new reference system enables simple rotation of vector P with the angle $\Gamma$ about PxD through A. We now return to our original reference system.

We wish to calculate the vector AB:

$$u(\Gamma) = \cos(\Gamma)P + \sin(\Gamma)D.$$

We know that the z-component of $u(\Gamma_0)$ $$u_z(\Gamma_0) = 1/m\, AB_z = 1/m\, \Delta h,$$

with $u_z$ and $AB_z$ being the projection of u and AB on the vertical z-axis, $\Delta h$ being the measured or calculated vertical height difference between A and B based on the depth measurements. Thus, $$u_z(\Gamma_0) = \cos(\Gamma_0)P_z + \sin(\Gamma_0)D_z = 1/m\, \Delta h,$$

$P_z$, $D_z$ being the projections of the vectors P and D onto the vertical axis, so that $$\cos(\Gamma_0)P_z = \Delta h/m - \sin(\Gamma_0)D_z => (1-\sin^2(\Gamma_0))P^2_z = (\Delta h/m - \sin(\Gamma_0)D_z)^2,$$
giving an ordinary second degree expression of $\sin(\Gamma_0)$:

solving for $\sin(\Gamma_0)$ we obtain:

$$\sin(\Gamma_0) = \frac{\frac{\Delta h D_z}{m} \pm P_z \sqrt{D_z^2 + P_z^2 - \frac{\Delta h^2}{m^2}}}{D_z^2 + P_z^2}$$

It seems that in real examples the sign shall be negative. Thus:

$$\sin(\Gamma_0) = \frac{\frac{\Delta h D_z}{m} - P_z\sqrt{D_z^2 + P_z^2 - \frac{\Delta h^2}{m^2}}}{D_z^2 + P_z^2} \equiv s_0 \quad (4)$$

Since $$\overline{AB} = m\bar{u}(\Gamma_0) = m(\cos\Gamma_0 \overline{P} + \sin\Gamma_0)\overline{D} = m(\pm\sqrt{1-s_0^2}\overline{P} + s_0\overline{D})$$

Clearly:

$$\overline{AB} = m(\sqrt{1-s_0^2}\overline{P} s_0 \overline{D}) \quad (5)$$

Thus we may express vector AB in the first mentioned coordinate system as $$AB = ae_1, be_{2r}, ce_{3r}$$

as P and D may be expressed in the original reference system xr, yr, zr with unit vectors $e_{1r}$, $e_{2r}$, $e_{3r}$.

We now will calculate the relative azimuth ΔAz. The strategy is here to find a unit vector (not z) defined in our standard reference system, but based on the base unit (1) instead of the reference unit (1).

We choose to regard the angle against the corresponding unit vector in our standard coordinate system. Let $e_{1b}$, $e_{2B}$, $e_{3B}$ be the unit vectors in the reference system of the base metrology unit (2). Let $$e_{1B}, e_{2B}, e_3 = e_{1r}, e_{2r}, e_{3r}$$

be the unit vectors of the "standard" reference system as described previously for the reference unit (1).

$$e_1 = [1,0,0] \quad e_2 = [0,1,0] \quad e_3 = [0,0,1].$$

Definitions:

$$e_{1B} = [x1, y1, 0] \quad e_{2B} = [x2, y2, 0] \quad e_{3B} = e_3$$

To find the relative azimuth of the cable 3 with respect to the base metrology unit 2, in the new reference system $e_{1B}$, $e_{2B}$, $e_{3B}$, we repeat steps (1) to (5) above with the values from metrology unit 2: $\gamma_B$ is the same as angle $\theta_B$ measured by the "azimuth sensing device" 92 measured in the base plane of metrology unit 2, the submerged depth difference $\Delta h_{Rb}$ ($\Delta d_{Rb}$) is, as before, the elevation difference between points A and B of FIG. 3, and the scalar m is still the measured length of vector BA being the opposite vector of AB.

$$BA = AB = ae_{1B}, be_{2B}, ce_{3B}. \quad (6)$$

a, b and c are thus known from the previous calculation of vector AB.

$$AB_x = ax1 + bx2 + c \cdot 0, \text{ and}$$

$$AB_y = ay1 + by2 + c \cdot 0, \text{ and}$$

$$AB_z = a \cdot 0 + b \cdot 0 + c \cdot 1.$$

Since $e_{1B}$ and $e_{2B}$ are perpendicular unit vectors as drawn in FIG. 3, we have x1=y2 and y1=−x2.

$$AB_x = ay2 + bx2 \text{ and}$$

$$AB_y = ax2 + by2$$

which leads to $$x_2 = \frac{AB_x - ay_2}{b} = \frac{AB_x - \frac{a}{b}(AB_y + ax_2)}{b}$$

$$x_2\left(1 + \frac{a^2}{b^2}\right) = \frac{AB_x}{b} - \frac{a}{b^2}AB_y$$

and then $$x_2 = \frac{AB_x - \frac{a}{b}AB_y}{b\left(1 + \frac{a^2}{b^2}\right)} \quad y_2 = \frac{AB_y + ax_2}{b}$$

Since the sine of the azimuth difference sin ΔAzimuth=x2, $$\Delta Azimut = \sin^{-1}(x_2) = \sin^{-1}\left(\frac{AB_x - \frac{a}{b}AB_y}{b\left(1 + \frac{a^2}{b^2}\right)}\right) \quad (7)$$

Thus the ΔAzimuth is calculated.

Then we find vector $BO_B$ which is the vector the entry point. B of the wire 3 into metrology unit 2 and down to the center $O_B$ of the pipe's 200 end 20:

$$BO_B = R_b[x3, y3, z3]:$$

Assume: 1) ΔAzimut=0; 2) $\beta_B$=0; 3) $\alpha_B$=0.

$$BO_{B0} = R_b[x0, y0, z0] = [0, 0, -1].$$

Assume variable $\alpha_B <> 0$:

$$BO_{B1} = R_b[x1, y1, z1] = R_b[-\sin(\alpha_B), 0, \cos(\alpha_B)]$$

Assume variable $\alpha_B$ and $\beta_B$:

$$BO_{B2} = R_b[x1, y2, z2] = R_b[-\sin(\alpha_B)\cos(\alpha_B)\sin(\beta_B), -\cos(\alpha_B)\cos(\beta_B)]$$

Assume the general case with variable ΔAzimut, $\beta_B$ and $\alpha_B$:

$$x3 = \sin(\Delta A)y2 - \cos(\Delta A)x2,$$

$$y3 = -\sin(\Delta A)x2 - \cos(\Delta A)y2,$$

$$z3 = z2;$$

$$BO_B = R_b[x3, y3, z3] = R_b[\sin(\Delta A)\cos(\beta_B)\sin(\beta_B) + \cos(\Delta A)\sin(\alpha_B),$$
$$\sin(\Delta A)\sin(\Delta_B) - \cos(\Delta A)\cos(\alpha_B)\sin(\beta_B), \cos(\alpha_B)\cos(\beta_B)],$$

Thus $$BO_B = R_b[-\sin(\alpha_B)\cos(\Delta A), \sin(\alpha_B)\sin(\Delta A), -\cos(\alpha_B)\cos(\beta_B)]. \quad (8)$$

The center-to center vector from $O_r$ at pipe end 10 to $O_B$ at pipe end 20 is:

$$O_r O_B = A + AB + BO_B. \quad (9)$$

The metrology units 1 and 2 may be fixed with each their baseline offset along the pipe, from the pipe end. We name the points at the center of the pipe end 10 $P_r$ and the center of the pipe end 20 $P_B$. We call $b_r$ the offset of metrology unit 1 from the pipe end 10 at the reference, and $b_B$ the offset of metrology unit 2 from the pipe end 20 at the base unit 2. We wish to find the vector $P_rP_B$. Let x2 and y2 be defined as with equation (6):

$$P_rO_r = -E \cdot b_r$$

$$O_BP_B = b_BE_B = b_B(\cos\beta_B e_{2B} + \sin\beta_B(-e_{2B})) = b_B[\cos\beta_B x2, \cos\beta_B y2, -\sin\beta_B]$$

$$P_rP_B = P_rO_r + O_rO_B + O_BP_B. \quad (9b)$$

Side-deviation is defined as the component of the vector $P_rP_B$ in the x-direction:

$$\text{Side deviation} = -P_rP_{Bx}. \quad (10)$$

The total distance is the scalar value of the vector $P_rP_B$:

$$\text{Total distance} = |P_rP_B| \quad (11)$$

The elevation difference is the component of the vector $P_rP_B$ in the z-direction:

$$\Delta\text{elevation} = P_rP_{Bz}. \quad (12)$$

The vertical angle difference, $\Delta$vert, is $$\Delta\text{vert} = \Delta\text{refvert} + \alpha\text{basevert}. \quad (13)$$

The azimuth angle at the reference is:

$$Az_{ref} = \tan^{-1}\left(\frac{-P_rP_{Bx}}{P_rP_{By}}\right) \quad (14)$$

The azimut angle at the base is:

$$Az_B = Az_{ref} - \Delta\text{Azimuth}.$$

We have thus shown that given the parameters measured by the metrology units 1 and 2 as described in the method for metrology in a previous paragraph, these parameters are sufficient to have a complete geometrical description of a rigid jumper spoolpiece of given length and termination angles in 3-D.

In the known art, a relative-inclination measurement device arranged to measure the taut-wire inclination with respect to the flange metrology device's horizontal plane $x_F$, $y_F$ is included in the apparatus of the known art. Similarly an inclination scale is included in the metrology apparatus in the other end of the wire. These inclinometers are no longer necessary according to present invention. According to the known art, at least two visual readings must be conducted by the ROV operator, of the wire inclinations at either end of the wire (3). The known device is time-consuming during reading of the inclinations, and also encumbered with parallax erros.

The calculation of the inclination $I_w$, of the taut wire 3 may, in the most simple implementation be:

$$I_w = \arctan\left(\frac{\Delta d_{rB}}{D_{rB}}\right) = \arctan\left(\frac{d_r - d_B}{D_{rB}}\right)$$

This inclination is not strictly needed because the formulas above have been shown sufficient to calculate the relative orientations of the two metrology units on the two flanges.

Computer Implementation

All the formulae above may best be implemented as a algorithms in a program in a computer. The measured values may be transferred to the surface via the ROV umbilical 81. The calculations of distance and relative angles may be made with the computer 80 on board the surface vessel 8 and with an online presentation in a side view and in a plane view of the calculated positions of the base unit 2 with respect to the reference unit 1, as shown as an example readout in FIG. 5a. FIG. 5b shows a vessel 8 with a computer output 80 in the middle of the Figure. The calculated values may be transferred to a post-processor 800 for producing CAD-drawings (5') in engineering format for the production of the spoolpiece 5.

Robustness of Measurements

The system is robust in that the readings are not very sensitive to verticality as long as the metrology units are attached with their horizontal base plane within, say 10 degrees, from the true horizontal. This deviation from horizontality may even be read off with the ROV during attachment of the metrology units 1, 2 to the terminations 10,20 in case the automatic reading with the inclinometers in each metrology unit 1,2 should fail.

The invention has been described as a preferred embodiment as a metrology system with spesific reference to a subsea manifold hub and a pipeline termination. Clearly, the invention may be used for precision metrology for any other subsea equipment where distance and relative orientation of two units is needed. This may be precision metrology of markers' positions and orientation with respect to an oriented reference marker "m" at the seabed, e.g. to check if ground movement occurs during a time period.

Displacement Along the Pipe or Hub

The invention also covers the problem with displacement of one or both metrology units 1 and/or 2 with all kinds of offset along the pipe, vertically from the pipe and in the direction across the pipe, in case the metrology units may not be attached directly to the flange at the end of the pipe. This offset problem is covered by equations (9b) to (14).

Multiple Hubs on a Manifold

Multiple pre-measured terminations 10 (hubs) of known positions on a subsea manifold 100, e.g. as shown in FIG. 2, and metrology of only spesific terminations relative to other terminations 20 at the seabed, may save much subsea metrology work and leave the rest of the metrology work to be calculated from the subsea metrology and the (known) pre-measured metrology of the hubs 10.

What is claimed is:

1. Device for subsea metrology of distance and relative orientation of a first termination (10) with a local reference system ($x_r$, $y_r$, $z_r$) and which by means of a jumper spool piece (5) is going to be connected to a separate second termination (20) having a local reference system ($x_B$, $y_B$, $z_B$), comprising a base metrology unit (2) arranged for being carried by an ROV (4), and arranged for aligned arrangement with the second or the first termination's (20,10) reference system, and comprising the following features:
a wire (3) with an extractable first end (31) being arranged for being attached to a receptacle device (7,7') arranged on the termination (10,20) for receiving the wire's (3) first end (31) or a metrology unit and with a wire tensioner device (32) arranged for tensioning the wire (3) between the base metrology unit (2) and the receptacle device (7,7');
a wire length sensor (34) arranged for measuring the length ($D_{rB}$) of the extended taut wire (3);
a relative azimuth sensing device (92) arranged to measure the relative azimuth ($\theta_B$, $\theta_r$) value of the taut wire (3) with respect to the base metrology unit's (2) mainly horizontal axes ($x_B$, $y_B$), and
a submerged-depth sensor (52) arranged for measuring the submerged depth ($d_B$) of the base metrology unit (2).

2. Device according to claim 1, comprising transfer means (33) for transmitting the measured values of at least the submerged depth value ($d_B$) and the relative azimuth value ($\theta_B$, $\theta_r$) from the base metrology unit (2) to the ROV (4).

3. Device according to claim 1, comprising a reference metrology unit (1) arranged to be carried by an ROV (4), attached to the wire's (3) first extendable end (31), comprising the following features:

a relative azimuth sensing device (91) arranged to measure and store the value of the taut wire's (3) relative azimuth ($\theta_r$) with respect to the reference metrology unit's (1) horizontal axes ($x_r$, $y_r$);

a submerged-depth sensor (51) arranged on the reference metrology unit (1) for measuring the submerged depth ($d_r$).

4. Device according to claim 3, wherein the transfer means (33) are arranged for transmitting measured values from the reference metrology unit (1) to the base metrology unit (2) or to the ROV (4).

5. Device according to claim 2, wherein the transfer of values from the reference metrology unit (1) to the base metrology unit (1,2) comprises at least the submerged depth ($d_r$), and the relative azimuth ($\theta_r$).

6. Device according to claim 1, comprising orthogonal inclination sensors (72x, 72y) arranged to measure the base metrology unit's (2) horizontal axes' ($X_B$, $Y_B$) inclinations ($Ix_B$, $Iy_B$) with respect to the true horizontal plane.

7. Device according to claim 1, comprising means for calculating the relative positions and orientations of the first termination (1) and the second termination (2) based on the relative azimuths ($\theta_r$), and ($\theta_B$), the submerged-depth difference ($\Delta d_{Rb}$) between the reference depth reading ($d_r$), the base depth reading ($d_B$) and the extended length ($D_{Rb}$) of the taut wire (3).

8. Device according to claim 3, comprising orthogonal inclination sensors (71x, 71y) arranged to register the reference metrology unit's (1) mainly horizontal axes' ($x_r$, $y_r$) inclinations ($Ix_r$, $Iy_r$) with respect to the true horizontal plane.

9. Device according to claim 4, wherein the transfer of measured values includes the inclination values ($Ix_r$, $Iy_r$) of the reference metrology unit's (1) horizontal axes ($X_r$, $Y_r$) with respect to the horizontal plane.

10. Device according to claim 4, wherein the transfer means (33) comprise a hydroacoustic transmitter (330a) arranged on the metrology unit (1), and a hydroacoustic receiver (330b) arranged on the metrology unit (2), for transferring the values ($d_r$) of the depth measurement ($d_r$) and the relative azimuth ($\theta_r$) from the metrology unit (1) to the base metrology unit (2) residing on the ROV.

11. Device according to claim 4, wherein the transfer means (33) comprise a cable transmitter (332a) arranged on the metrology unit (1) and a cable receiver (332b) arranged on the metrology unit (2) via cable means (332) for transferring the values ($d_r$) of the depth measurement and the relative azimuth ($\theta_r$) from the metrology unit (1) through the wire (3) to the base metrology unit (2) on the ROV.

12. Device according to claim 2, comprising means for transmitting at least the following parameters to a vessel (8) at the surface:

the taut wire's (3) relative azimuth value ($\theta_B$), with respect to the base metrology unit's (2) axes ($x_B$, $y_B$);

the taut wire length value ($D_{Rb}$)

the value of the depth reading ($d_B$).

13. Device according to claim 12, wherein the means for transmitting the following parameters to the vessel (8) at the surface also comprise:

the taut wire's (3) relative azimuth value ($\theta_r$) with respect to the reference metrology unit's (1) axes ($x_r$, $y_r$);

the value of the depth reading ($d_r$).

14. Device according to claim 12, configured to transfer of the following values:

the inclination values ($Ix_r$, $Iy_r$) of the reference metrology unit's (1) horizontal axes ($x_r$, $y_r$) with respect to the true horizontal axes ($x_B$, $y_B$) with respect to the true horizontal plane.

15. Device according to claim 1, comprising means for calculating the depth difference ($\Delta d_{Rb}$) between the reference depth reading ($d_r$) and the depth reading ($d_B$).

16. Device according to claim 1, wherein the relative azimuth sensor (92) is arranged to measure the taut-wire's (3) relative azimuth ($\theta_B$) in the base-plane ($x_B$, $y_B$) with respect to the metrology device's (2) $y_B$-axis.

17. Device according to claim 3, wherein the relative azimuth sensor (91) is arranged to measure the taut-wire's (3) relative azimuth ($\theta_r$) in the base-plane ($x_r$, $y_r$) with respect to the metrology device's (1) $y_r$-axis.

18. Device according to claim 1, comprising a stiff wire-keeping arm (32') comprising the wire's (3) running-end point (32'), pivoted around a single point (32) swinging freely in two planes, e.g. the ($x_B$, $y_B$)-plane and any ($y'_B$, $z_B$)-plane in the base metrology unit (2), and being coupled to the azimuth sensing device (92).

19. Device according to claim 3, comprising a stiff wire-keeping arm (31') constituting the wire's (3) end (31), pivoted around a single point (31) swinging freely in two planes, e.g. the ($x_r$, $y_r$)-plane and any ($y'_r$, $z_r$)-plane in the reference metrology unit (1), and being connected with the azimuth sensing device (91).

20. Device according to claim 1, wherein a wire tensioner termination point (320) comprising a flexible wire hose (322) being arranged between the origin (32') of the three-axis reference system ($x_B$, $y_B$, $z_B$) of the base metrology unit (2) and with the wire tensioner arranged to transfer the longitudinal cable forces along the cable.

21. Device according to claim 20, wherein the wire tensioner (32) is arranged at the ROV (4), with a wire tensioner termination point (320) arranged at the origin (32) of the three-axis reference system ($x_B$, $y_B$, $z_B$) of the base metrology unit (2).

22. Method for subsea metrology comprising the following steps:

by means of an ROV (4), extending a wire (3) between a receptacle device (7) having a known position in a local reference system ($x_r$, $y_r$, $z_r$) relative to a first termination (10) or in a receptacle device (7') in a local reference system ($x_B$, $y_B$, $z_B$) relative to a second termination (20);

tensioning the wire (3);

measuring the extended taut wire length ($D_{rB}$), measuring the submerged depth ($d_B$) of the second termination (20), measuring the taut wire's (3) relative azimuth ($\theta_r$) in the plane of the second termination's (20) mainly horizontal axes ($x_B$, $y_B$), measuring the submerged depth ($d_r$) of the first termination (10), measuring the taut wire's (3) relative azimuth ($\theta_r$) in the plane of the first termination's (10) mainly horizontal axes, using the measured values of the taut wire's (3) relative azimuths ($\theta_B$, $\theta_r$); the extended wire length ($D_{rB}$), the submerged depth values ($d_B$, $d_r$) to calculate the relative position and orientation of the second termination (20) in the reference system ($x_r$, $y_r$, $z_r$) of the first termination (10).

23. Method according to claim 22, wherein the inclination values ($Ix_r$, $Iy_r$) of the mainly horizontal axes ($x_r$, $y_r$) with respect to the true horizontal plane are measured;

the inclination values ($Ix_r$, $Iy_r$) of the mainly horizontal axes ($x_B$, $y_B$) with respect to the true horizontal plane are measured; and that the inclination values ($Ix_r$, $Iy_r$) and the inclination values ($Ix_B$, $Iy_B$) are used in the calculation of the relative position and orientation of the second termination (20).

24. Method for mapping of a subsea surface comprising conducting the following steps at least once:

extending a wire (3) between a receptacle device (7) having a known position in a local reference system ($x_r$, $y_r$, $z_r$) relative to a first termination (10), and an ROV (4) situated at a freely selectable point of the surface, and tensioning the wire (3);

measuring the extended taut wire length ($D_{rB}$) at the ROV (4), measuring the submerged depth ($d_B$) of the ROV (4);

measuring the taut wire's (3) relative azimuth ($\theta_r$) in the plane of the first termination's (10) mainly horizontal axes ($x_r$, $y_r$), transmitting the measured values of relative azimuth ($\theta_r$) to the ROV (4);

using the measured values of the taut wire's (3) relative azimuth ($\theta_r$), the extended wire length ($D_{rB}$), and the submerged depth values ($d_B$) to calculate by means connected to the ROV (4), the relative position of the ROV (4) in the reference system ($x_r$, $y_r$, $z_r$) of the first termination (10).

25. Method for positioning at a subsea surface, comprising conducting the following steps at least once:

a) giving a desired position's relative polar coordinates as a taut wire's (3) desired relative azimuth ($\theta_{rd}$), extended wire length ($D_{rBd}$), to command the desired relative position of an ROV (4) in a local fixed reference system ($x_r$, $y_r$, $z_r$) of a first termination (10);

b) extending a wire (3) between a receptacle device (7) having a known position in the local reference system ($x_r$, $y_r$, $z_r$) relative to a first termination (10), and the ROV (4), and tensioning the wire (3);

c) measuring the taut wire's (3) relative azimuth ($\theta_r$), the extended wire length ($D_{rB}$), to calculate the polar coordinate difference ($\theta_r - \theta_{rd}$, $D_{rB} - D_{rBd}$)_$\theta_{rd}$, $D_{rB} - D_{rBd}$) between the desired relative position and the measured relative position of the ROV (4), d) moving the ROV (4) in order to minimize the position difference; and repeating steps (c) and (d) until the difference is small enough, and marking off the desired position at the surface.

26. Method according to claim 25, wherein the desired submerged depth value ($d_{Bd}$) is taken into consideration in step (a); and the submerged depth value ($d_B$) is taken into the measurement in step (c).

27. Method according to claim 26, comprising giving the same desired position's relative polar coordinates as a desired relative azimuth ($\theta'_{rd}$), extended wire length ($D'_{rBd}$), to command the desired relative position of an ROV (4) in a local fixed reference system ($x_r$, $y_r$, $z_r$) of another termination (10b) with a known position and orientation with respect to the first termination (10), and b) extending the wire (3) between the receptacle device (7b) having a known position in the local reference system ($x_r$, $y_r$, $z_r$) relative to the termination (10b), and moving the ROV (4) to the position marker (m), and tensioning the wire (3);

c) measuring the taut wire's (3) relative azimuth ($\theta_r$), the extended wire length ($D'_{rB}$), to calculate the polar coordinate difference ($\theta_r - \theta_{rd}$, $D_{rB} - D_{rBd}$) between the desired relative position and the measured relative position of the ROV (4).

28. The method of claim 25, wherein the subsea surface is a seabed.

29. The method of claim 25, wherein the subsea surface is a fixed structure.

30. The method of claim 25, wherein the desired position at the surface is marked off by a marker buoy.

31. The method of claim 28, wherein the desired position at the surface is marked off by a marker buoy.

32. The method of claim 24, wherein the subsea surface is a fixed structure or a sea bed.

* * * * *